(12) United States Patent
Tong et al.

(10) Patent No.: US 11,788,562 B1
(45) Date of Patent: Oct. 17, 2023

(54) ARTIFICIAL MUSCLE FOR ROBOTIC SYSTEMS

(71) Applicant: The Chinese University of Hong Kong, Hong Kong (CN)

(72) Inventors: Kai Yu Tong, Hong Kong (CN); Disheng Xie, Hong Kong (CN); Jing Shu, Hong Kong (CN); Junming Wang, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 0 days.

(21) Appl. No.: 17/664,124

(22) Filed: May 19, 2022

(51) Int. Cl.
*F15B 15/10* (2006.01)
*B25J 9/10* (2006.01)
*B25J 9/14* (2006.01)

(52) U.S. Cl.
CPC ........... *F15B 15/103* (2013.01); *B25J 9/1075* (2013.01); *B25J 9/142* (2013.01)

(58) Field of Classification Search
CPC ......... B25J 9/1075; B25J 9/142; F15B 15/103
See application file for complete search history.

(56) References Cited

U.S. PATENT DOCUMENTS

| | | | |
|---|---|---|---|
| 3,570,814 A | | 3/1971 | MacGregor-Comarain |
| 5,018,436 A | * | 5/1991 | Evangelista ............ F01B 19/00 92/92 |
| 8,349,020 B2 | | 1/2013 | Majoe |
| 2018/0058480 A1 | * | 3/2018 | Asai .......................... B25J 9/142 |
| 2022/0001530 A1 | * | 1/2022 | Sameoto ............... B32B 27/283 |

OTHER PUBLICATIONS

Abe, T., et al., "Fabrication of '18 Weave' Muscles and Their Application to Soft Power Support Suit for Upper Limbs Using Thin McKibben Muscle," IEEE Robotics and Automation Letters, 2019, 4(3):2532-2538.
Zhu, M., et al., "Fluidic Fabric Muscle Sheets for Wearable and Soft Robotics," Soft Robotics, 2020, 7(2):179-197.

\* cited by examiner

*Primary Examiner* — Kenneth Bomberg
*Assistant Examiner* — Daniel S Collins
(74) *Attorney, Agent, or Firm* — Saliwanchik, Lloyd & Eisenschenk

(57) ABSTRACT

The subject invention pertains to a pneumatic, hydraulic, or otherwise inflatable or pressurized artificial muscle. Also provided are methods for making, controlling, and using such a muscle useful for prostheses, movement aids, or wearable robots to assist the movement of impaired subjects or to improve the function of healthy subjects. Muscles can be made by densely winding tension wires around pressurized expandable tubes having one or more specific geometric shapes removed from the tube cross section. The curve of output characteristics such as output force vs. contraction ratio can be adjustable by changing parameters of the sectional view of the tube. The appropriate shape of tube and related output characteristics can be selected according to application area or body part to be assisted to achieve the most flexible and optimal design for one or more muscle groups.

17 Claims, 22 Drawing Sheets

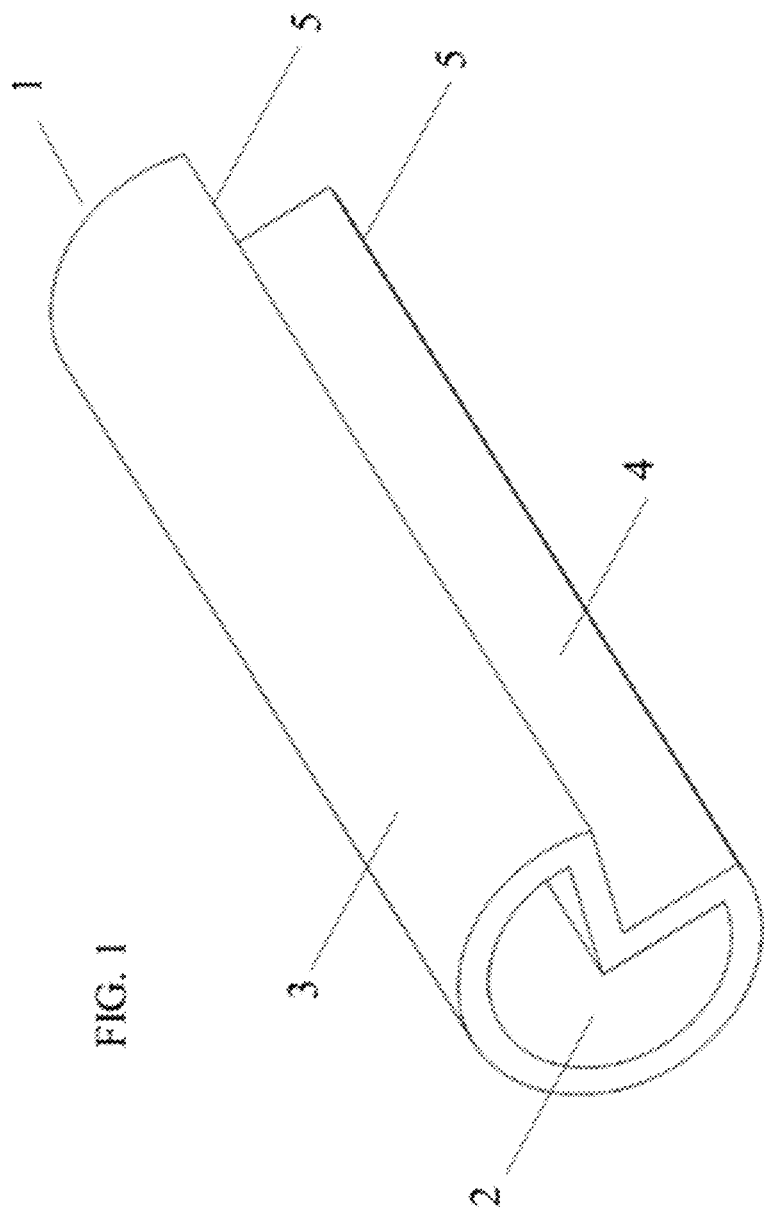

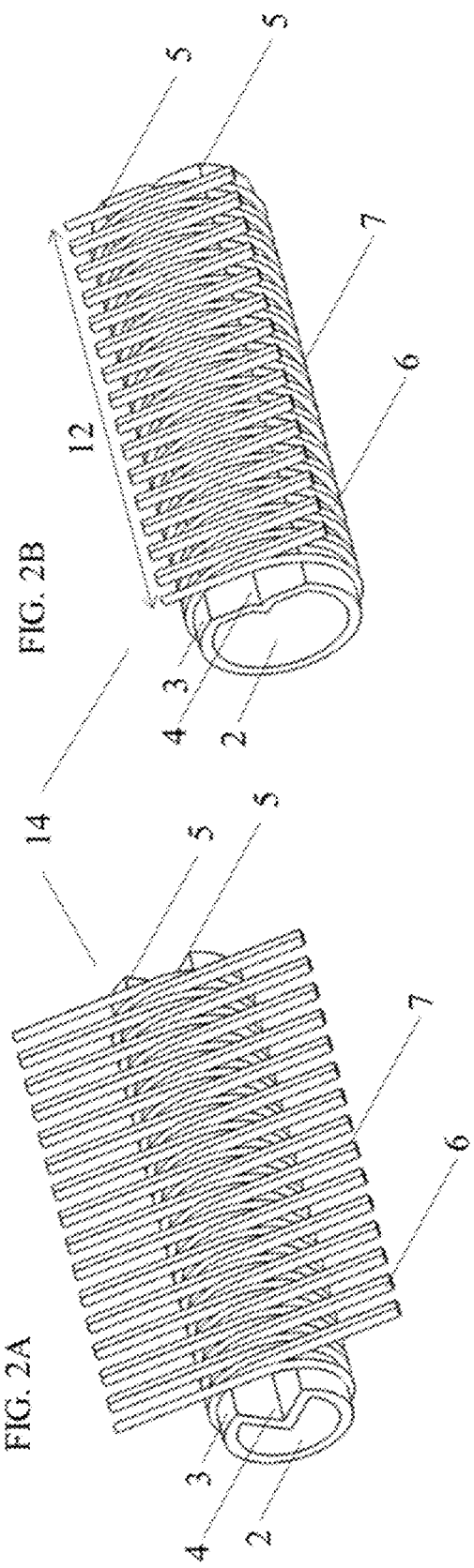

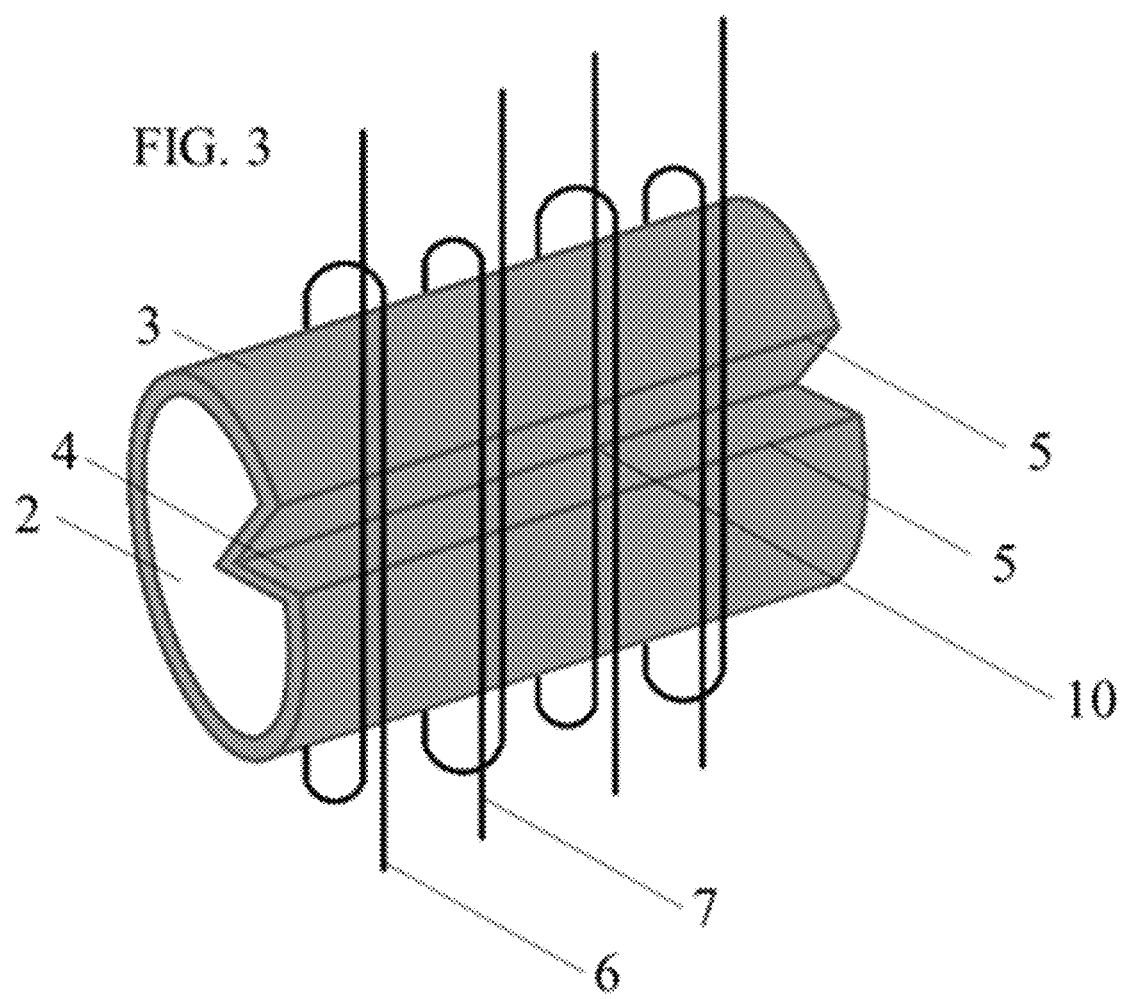

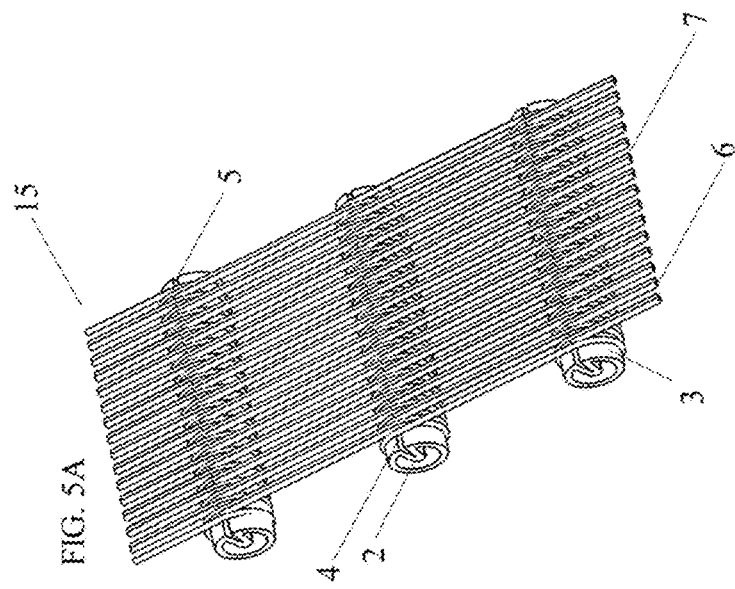
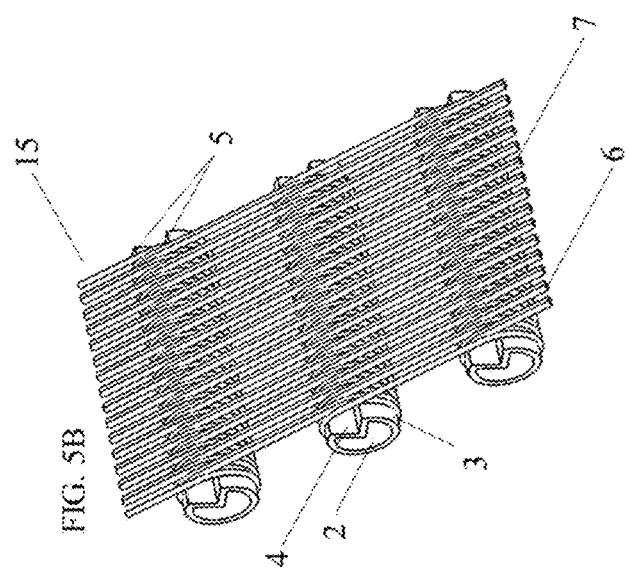
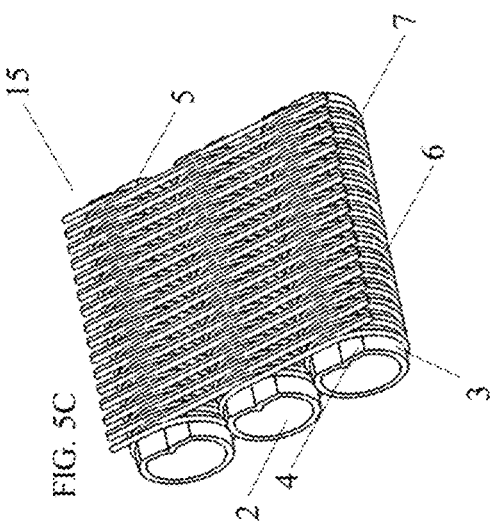

(a)

ARTIFICIAL MUSCLE FOR ROBOTIC SYSTEMS

BACKGROUND OF THE INVENTION

A widely used pneumatic artificial muscle is the McKibben muscle. Braided net can be used to wrap an inflatable tube, so that the radial expansion of tube is transformed into axial contraction. In order to achieve a higher contraction ratio, the radial expansion of the muscle must be increased. When close fitted on a subject, the high radial expansion can interfere with the movements of the user. In addition, the stiffness increasing during pressurization often causes additional discomfort to the user when worn close to body.

BRIEF SUMMARY OF THE INVENTION

Embodiments of the subject invention provide a pneumatic artificial muscle and related control systems useful for wearable robots to assist the movement of impaired subjects or to improve the function of healthy subjects.

Compared with related art systems and methods, the densely wound tension members (e.g., wires) provided by embodiments of the subject invention advantageously places expansion members (e.g., tubes) on one side of tension members (e.g., wires, also referred to as tension wires), in a manner that inhibits, reduces, or minimizes actions (e.g., squeezing or pinching) to the wearer's skin that can cause discomfort, pain, or reduced range of motion. Embodiments are suitable for close fitting while maintaining the movement range of the user. Embodiments further provide a modular design, that can be configured to inhibit increasing of stiffness of the muscle when pressurized, further improving the comfort of the artificial muscle when worn close to body. Because embodiments can provide a curve of output characteristic that is adjustable (e.g., by simple changes to the sectional geometry of the tube), the appropriate design can be selected according to body part to be assisted to achieve the most flexible and optimal state of action. In one exemplary and non-limiting embodiment, the effective moment arm of the middle deltoid muscle initially decreases and then increases with increasing angle of the arm rising away from the torso during shoulder flexion. In this application, the design parameters (e.g., number, thickness, spacing, size, and sectional geometry of tubes) can be advantageously selected to produce a convex output characteristics of the actuator, resulting in a kinematic output of the moment of the actuator acting through the shoulder that can be precisely, nearly, approximately, or quasi-constant for a specific shoulder application, that offers advantages for ease, precision, accuracy, and implementation of control.

Embodiments provide expansion members, also called tubes, having one or more specific geometric shapes removed from the tube cross section to provide beneficial characteristics for contraction of the artificial muscle. Embodiments can contract further or more fully than related art designs and by focusing the expansion of one or more tubes on one side of tension members, also called wires, to minimize, reduce, or eliminate squeeze, friction, or pinching on the wearer's skin, that can cause pain or discomfort. Therefore, embodiments are suitable for close fitting while maintaining the movement range of the user. Embodiments can also provide a modular design that enables reduced rate of increasing stiffness of the muscle when pressurized, that further improves the comfort of the artificial muscle when worn close to body. Because the curve of output characteristics (e.g., output force vs. contraction ratio) can be adjustable by simply changing certain parameters (e.g., of the sectional view of the tube), the appropriate shape of tube and related output characteristics can be selected according to body part to be assisted to achieve the most flexible and optimal state for one or more muscle groups.

As an example, the moment arm of the middle deltoid muscle during shoulder flexion decreases and then increases with angle of arm increasing. Hence if the output characteristic of the actuator (e.g., replacing or aiding the middle deltoid muscle) is convex, the resulting moment of the actuator acting on the shoulder is quasi-constant, a condition that is advantageous for control.

The contraction ratio is a crucial performance parameter for wearable robot applications. When a soft actuator is applied in assistance for arm flexion, the minimum contraction ratio required can be 40%. The contraction ratio of the actuator provided by embodiments of the subject invention can easily achieve a contraction ratio of 40% or more. However, for this is not true for related art actuators (e.g., a McKibben muscle.)

In certain related art systems and methods, braided net is used to wrap an inflatable tube, so that the radial expansion of tube is transformed into axial contraction. In such systems, to achieve a higher contraction ratio, the radial expansion of the muscle is large. When close fitted, the expansion intervenes or interferes with the movements of user. In addition, the stiffness increasing during pressurization causes additional discomfort to the user when worn close to the body. Compared with known related art methods (e.g., the McKibben muscle), the densely wound wire routing of the subject invention puts the expansion of tube on one side of wires, so that it does not squeeze the wearer's skin to cause discomfort. Therefore, the subject invention is suitable for close fitting while maintaining the movement range of the user. Additionally, the modular design can be configured to inhibit increasing of stiffness of the muscle when pressurized to further improve the comfort of the artificial muscle when worn closely to body. Because the curve of output characteristic is adjustable by simply changing the sectional view of the tube, the appropriate shape can be selected according to body part to be assisted to achieve the most flexible and optimal state.

In related art, the artificial muscle in U.S. Pat. No. 8,349,020B2 to Majoe has a flexible chamber and tendons. When pressurized, the diameter of the chamber increases. This increasing of diameter brings hysteresis of friction as the tendons must slide over the expanding section of chamber wall. Whereas in certain embodiments of the subject invention, the tube with removed sectional shape can be configured to pull the wires only by or primarily by the two contact edges (first contact edge and second contact edge) (5). Hence, the hysteresis caused by friction between the wires and the expanding section of the tube is avoided. Moreover, with various sectional shapes, different output characteristics can be obtained. The tendon in U.S. Pat. No. 8,349,020B2 is wide, as can be observed by conducting FEM analysis and experiment, this structure is prone to stress concentration on the edge of tendons since primarily the edge of the tendons is actually used for transmitting force. Hence, the ultimate total output force of the structure is further affected and limited by stress concentrations at the edges. The same is true for the diameter increasing and wide tendons of traction cylinder in U.S. Pat. No. 3,570,814 to Zuppiger. Whereas in embodiments of the subject invention densely wound wires are used to transmit force throughout the actuator with reduced stress concentrations so that the output efficiency of the overall muscle can be improved.

Embodiments of the subject invention can provide adjustable length, thickness, and output characteristics with high flexibility and comfort for motion assistance on most joints. People with common motor function injury or people requiring movement assistance to transfer heavy weight objects/person such as health care workers can benefit from applications of the subject invention.

BRIEF DESCRIPTION OF THE DRAWINGS

FIG. 1 shows an isometric view of a tube in an artificial muscle according to an embodiment of the subject invention.

FIG. 2A shows an isometric view of an artificial muscle in initial state, according to an embodiment of the subject invention.

FIG. 2B shows an isometric view of an artificial muscle in pressurized state, according to an embodiment of the subject invention.

FIG. 3 shows a winding method suitable for an artificial muscle according to an embodiment of the subject invention.

FIG. 5A shows an isometric view of a multi-chambered muscle at minimal contraction, according to an embodiment of the subject invention.

FIG. 5B shows an isometric view of a multi-chambered muscle at a partial stage of contraction, according to an embodiment of the subject invention.

FIG. 5C shows an isometric view of a multi-chambered muscle at a full stage of contraction, according to an embodiment of the subject invention.

FIG. 17A depicts an artificial muscle actuator configured to produce or assist shoulder flexion in an initial depressurized extended state, according to an embodiment of the subject invention.

FIG. 17B depicts an artificial muscle actuator configured to produce or assist shoulder flexion in an activated pressurized contracted state, according to an embodiment of the subject invention.

DETAILED DISCLOSURE OF THE INVENTION

Figure 4A:
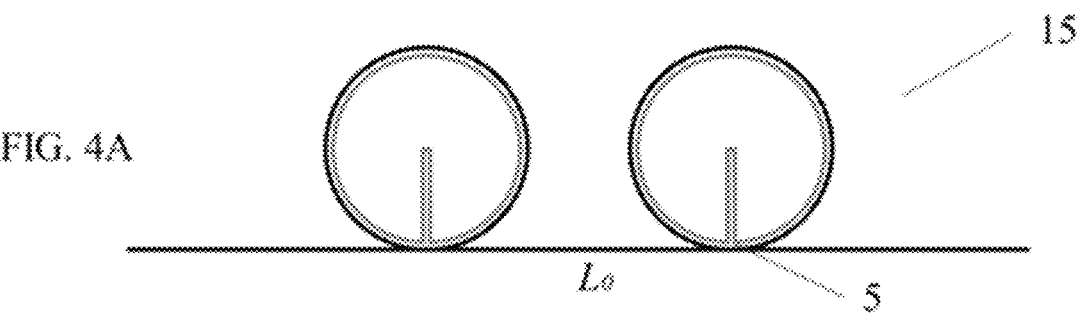
FIG. 4A shows a sectional view of a multi-chambered muscle at minimal contraction, according to an embodiment of the subject invention.

Embodiments of the subject invention can provide an artificial muscle comprising a hollow pressurized expansion tube having a length and an outer radius. The length can be defined along a path that is straight, curved, curvilinear, rectilinear, continuous, discontinuous, or any combination of the foregoing. The radius can be defined as the smallest uniform radius out from the path or a central axis in a specified direction (e.g., normal to the path) that encircles the entire body of the tube. The radius can be constant or different at various locations along the length (e.g., a continuous or stepwise transition up or down at or near one or both ends, a larger or smaller radius in or around a region where fluid is delivered to the tube, or a constant radius across an expansion zone of the tube.) Selection of a specific radius can have advantages in specific embodiments including providing sufficient control of muscle contraction while also providing sufficient force or range of contraction, fitting in or around a specific anatomical site, or operating in conjunction with the natural muscles of the user. The tube can be configured to change shape with pressurized expansion to transition the muscle between a relaxed low-pressure state and a contracted high-pressure state. Embodiments can further provide transitional states between relaxed and contracted, such as partially relaxed, medially contracted, or partially contracted. Embodiments can also provide a hyper-relaxed or hyper-extended state (e.g., a state where hyper-extension of the muscle forces additional fluid from the tube, compressing the tube below a resting or relaxed state), or a hyper-contracted state (e.g., a state where the tube is expanded beyond maximal contraction.) The expansion tube can include a generally cylindrical convex outer bearing surface extending along some or all (e.g., along a portion, a minority, a majority, most, all, or at least a majority) of the length and around a first portion of the radius. The bearing surface can be interrupted by a removed shape along some or all (e.g., along a portion, a minority, a majority, most, all, or at least a majority) of the length and around a second portion of the radius. The removed shape can define two contact edges, i.e., a first contact edge, a second contact edge, and a concave opening surface therebetween. Embodiments can include a tension wire comprising a first end extending in a first direction, a second end extending in a second direction opposed to the first direction, and a middle portion therebetween, the middle portion in contact with the bearing surface, the first contact edge, and the second contact edge, and the middle portion not in contact with the opening surface in the relaxed low-pressure state. The middle portion of the tension wire can wrap around the tube, such that as the middle portion increases in length, a corresponding length of the tension wire available for extension is reduced and the tension wire is contracted from end to end or in a region adjacent the middle portion on one or both sides. The bearing surface and the opening surface together can form the majority or essentially all of the circumference of the tube. Alternatively, the bearing surface can be a first bearing surface and the opening surface can be a first opening surface and the tube can comprise a second bearing surface, a second opening surface, additional bearing surfaces, or additional opening surfaces.

In certain embodiments the middle portion can come into contact with the opening surface in the contracted high-pressure state (e.g., as the tube changes shape with pressurized expansion and forces the opening shape to expand to the fill the removed shape out to the radius of the tube.)

In an embodiment, the tension wire being a first tension wire wound in a clockwise direction around the expansion tube; the muscle further comprises a second tension wire wound in a counterclockwise direction around the expansion tube and adjacent the first tension wire, creating a densely wound set of tension wires. Embodiments can provide additional adjacent tension wires, creating a larger densely wound set of tension wires.

Embodiments provide an opening surface that is fully contained within and spaced apart from the outer radius between the first contact edge and the second contact edge. The spacing between the opening surface and the outer radius can be constant, constantly changing, increasing, or decreasing across all or a portion of the distance between the first contact edge and the second contact edge.

The expansion tube can be configured to produce a specified motion between the first contact edge and the second contact edge with pressurized expansion of the tube.

In an embodiment, the expansion tube being a first expansion tube, the muscle further comprising a second expansion tube; and the muscle can be configured to create a specified output characteristic of the muscle with pressurized expansion in the first expansion tube or the second expansion tube, or both; wherein the specified output characteristic of the muscle produces a curve of output force versus contraction ratio that is concave, linear, convex, or a piecewise linear, stepwise, or curvilinear combination thereof.

In certain embodiments the specified output characteristic of the muscle produces a curve of output force versus contraction ratio that is advantageously convex (e.g., providing a force that is increasing, flat, or nearly flat in an early part of the contraction and decreasing, flat, or nearly flat in a later part of the contraction.)

In certain embodiments the first end of the first tension wire, the second end of the first tension wire, the first end of the second tension wire, and the second end of the second tension wire can each be wound on the same side of the expansion tube as the opening surface. Embodiments can advantageously obtain a smaller profile for a given contraction by placing multiple tubes on the same side of the windings of multiple wires, and by orienting the removed shape or opening surface of each tube to minimize bulk and expansion while maximizing contraction of the muscle.

Embodiments can provide a removed shape that is generally fan-shaped, round, oval, elliptical, square, wedge, triangular, rectangular, rectilinear, curvilinear, polygonal, or irregularly shaped. The removed shape can have an apex defining a minimum offset distance measured from an axis of the outer bearing surface in the direction of the removed shape in the relaxed low-pressure state. The minimum offset distance in certain embodiments being essentially zero. The minimum offset distance in other embodiments being greater than zero. The minimum offset distance in yet other embodiments being less than zero (negative values indicating an apex extending beyond the outer bearing surface in a relaxed low-pressure state.)

In certain embodiments, when the offset distance approaches zero, is about zero, is effectively zero, or equals zero, a large portion of plot of output characterization (output force versus displacement) is flat, i.e., the output force is nearly, approximately, or quasi-constant over large portion of displacement, that is advantageous for force control since the mapping between air pressure and output force can neglect changes in force versus displacement to simplify calculations and provide a simpler and less demanding control scheme or system.

Embodiments provide various methods of contracting an artificial muscle, the methods comprising the following steps or characteristics, in part, in combination, or in total: Providing at least one tension wire wrapped around at least one inflatable expansion tube having a generally convex outer bearing surface, the bearing surface interrupted by a removed shape defining a first contact edge, a second contact edge, a contact edge distance therebetween, and a concave opening surface therebetween; wrapping the wire around the tube such that a middle portion of the wire is in contact with the bearing surface, the first edge, and the second edge; and a first transitional portion of the wire extends from the middle portion at the first edge past the second edge, crossing a first region of the removed shape while maintaining a first separation distance between the wire and the opening surface throughout the first region of the removed shape; wherein a second transitional portion of the wire extends from the middle portion at the second edge past the first edge, crossing a second region of the removed shape while maintaining a second separation distance between the wire and the opening surface throughout the second region of the removed shape, a first end of the wire extends a first extension distance beyond the first transitional portion, and a second end of the wire extends a second extension distance beyond the second transitional portion, defining a first muscle length between the first end and the second end; and inflating the inflatable expansion tube to cause a change in shape of the tube that increases the contact edge distance, thereby pulling the first end of the wire closer to the second end of the wire to define a second muscle length that is less than the first muscle length, thus contracting the artificial muscle.

In certain embodiments at least a portion of the pulling of the first end of the wire closer to the second end of the wire occurs substantially without sliding contact between the wire and the opening surface. In other embodiments the wire is a first wire, wound in a clockwise direction around the tube, and the muscle further comprises a second wire wound adjacent the first wire in a counterclockwise direction around the tube; and the tube is a first tube, and the muscle further comprises a second tube positioned on the same side of the first wire and the second wire, wherein the first wire and the second wire are further wound around the second tube.

Embodiments provide an artificial muscle comprising a hollow pressurized expansion tube having a length and an outer radius and configured to change shape with pressurized expansion to transition between a relaxed low-pressure state and a contracted high-pressure state of the muscle, the expansion tube comprising a generally cylindrical convex outer bearing surface extending along the length and around a first portion of the radius, the bearing surface interrupted by a removed shape along at least a majority of the length and around a second portion of the radius, the removed shape defining a first contact edge, a second contact edge, and a concave opening surface therebetween; and a tension wire comprising a first end extending in a first direction, a second end extending in a second direction opposed to the first direction, and a middle portion therebetween, the middle portion in contact with the bearing surface, the first contact edge, and the second contact edge, but not in contact with the opening surface in the relaxed low-pressure state, the middle portion in contact with the opening surface in the contracted high-pressure state, the tension wire being a first tension wire wound in a clockwise direction around the expansion tube; the muscle further comprising a second tension wire wound in a counterclockwise direction around the expansion tube, the first tension wire adjacent the second tension wire, creating a densely wound set of tension wires; the first end of the first tension wire, the second end of the first tension wire, the first end of the second tension wire, and the second end of the second tension wire each being wound on the same side of the expansion tube as the opening surface.

In certain embodiments the opening surface is fully contained within and spaced apart from the outer radius between the first contact edge and the second contact edge; the expansion tube is configured to produce a specified motion between the first contact edge and the second contact edge with pressurized expansion; the expansion tube is a first expansion tube, the muscle further comprising a second expansion tube, and the muscle is configured to create a specified output characteristic of the muscle with pressurized expansion in the first expansion tube or the second expansion tube, or both; and the specified output characteristic of the muscle produces a convex curve of output force versus contraction ratio.

Figure 6A:
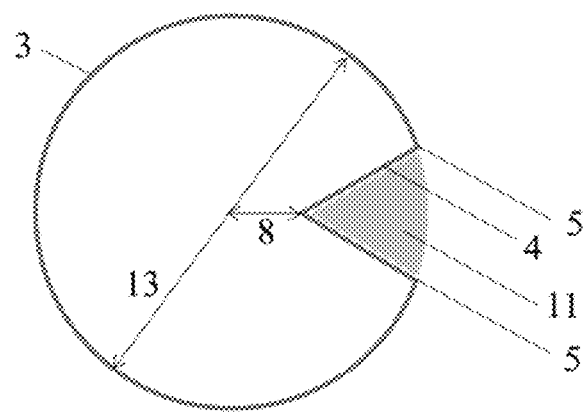
FIG. 6A shows a sectional view of a tube in an artificial muscle with an alternative small triangular wedge removed shape, according to an embodiment of the subject invention.
Figure 6B:
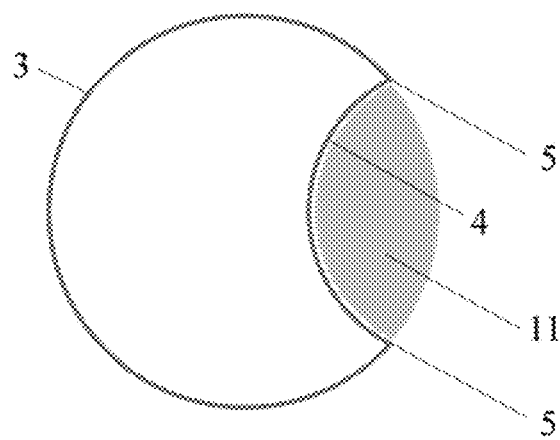
FIG. 6B shows a sectional view of a tube in an artificial muscle with an alternative partial arcuate removed shape, according to an embodiment of the subject invention.

Turning now to the figures, FIG. 1 shows an isometric view of a tube 1 in an artificial muscle according to an embodiment of the subject invention. The tube 1 is generally cylindrical because a certain shape (e.g., removed shape 11 as shown in FIG. 6A and FIG. 6B) is removed along the length of the tube (e.g., perpendicular to the sectional view) resulting in a tube geometry as shown in FIG. 1. The remaining material forms the bearing surface 3 of tube 1, the surface 4 resulting from removal of the removed shape, and two bottom surfaces or end caps 2 (not shown.) The bottom surfaces 2 in schematic figures (e.g., FIG. 1-FIG. 7) are omitted for clearer showing of the inner state of tube 1 and/or removed shape 11. The bottom surface or end cap can be flat, hemispherical, conical, frustoconical, tented, crimped, or other terminal shapes as known in the art. The bearing surface 3 can be generally cylindrical even if not a perfect cylinder (e.g., oval, elliptical, oblong, stretched, or other curved surfaces, as well as cylindrical approximations such as pentagons, hexagons, higher order polynomials, fine bellows, or accordion folds that would generally fit within a cylindrical profile are generally cylindrical, while protruding star shaped or triangular external profiles are not generally cylindrical.) Certain embodiments of the subject invention can comprise tubes or external profiles that are non-cylindrical, generally cylindrical, piecewise cylindrical, essentially cylindrical, or cylindrical. Generally cylindrical is a relatively broad categorization as described above. Piecewise cylindrical is defined by a given level of cylindricity (e.g., generally cylindrical, essentially cylindrical, or cylindrical) along a first portion of the length or the diameter of the tube, but not along a second portion of the length or the diameter of the tube. Essentially cylindrical is defined as more narrow and closer to a perfect cylinder than generally cylindrical but including minor designed or intended variances that still allow the tube to function and perform as a cylinder (e.g., a high order polygonal section, or a mildly elliptical or oval section.) Cylindrical is a relatively narrow categorization meant to require that the design of a region or portion be specified as a cylinder within the limits of design and manufacturing capabilities (e.g., including variances in wall thickness, surface finish, parting lines, seams, weld lines, and other artifacts of the manufacturing processes), or within the limits of measurement or perception of one of ordinary skill in the art. A tube, section, or surface can have a given level of cylindricity (e.g., piecewise cylindrical, generally cylindrical, essentially cylindrical, or cylindrical) while also having a removed section or other geometric feature (e.g., as shown in, but not limited to, each of FIG. 1-FIG. 7.)

In certain embodiments, the tube 1 is made by flexible material. When the tube 1 is pressurized, the surface 4 left by the removed shape 11 protrudes outward as shown in FIG. 2A-B, forcing first and second contact edges 5 apart, wherein the sectional area of tube 1 is enlarged, the middle portion 10 of tension wires 6, 7 increases in length and the extended length of tension wires 6, 7 is contracted as shown in FIG. 2B. Any expansion of bearing surface 3 of tube 1 under pressurization can result in additional contraction of tension wires 6, 7.

Referring to FIG. 2A-B, an artificial muscle according to an embodiment of the subject invention comprises a generally cylindrical tube 1 as shown in FIG. 1 where clockwise tension wires 6 and counterclockwise wires 7 are alternatively wound around the tube forming round, partially rounded, piecewise rounded, or generally rounded portions (e.g., with a shape determined by the interaction between the tension wire and the tube) called middle portion 10. The tension wires 6, 7 can be densely wound around the tube alternatively clockwise (e.g., 6) and counterclockwise (e.g., 7.) The alternating (e.g., overlapping, side-by-side) part of the wires or of each wire can be on the side of surface 4 (e.g., an opening surface) left by the removed shape 11 as shown in FIG. 3. Middle portions 10 excluding alternating parts of the tension wires can be bonded to the bearing surface 3 of the tube 1. In this way, a one-module artificial muscle 14 can be formed. In certain embodiments the wires 6, 7 can be made by inextensible material. As shown in FIG. 2B, when the tube 1 is pressurized, first and second contact edges 5 (e.g., two edges defined at the boundaries of the surface 4 left by the removed shape 11) pull tension wires 6, 7 inward and the overall length of the one-module muscle 14 decreases or contracts and generates output force.

Figure 4B:
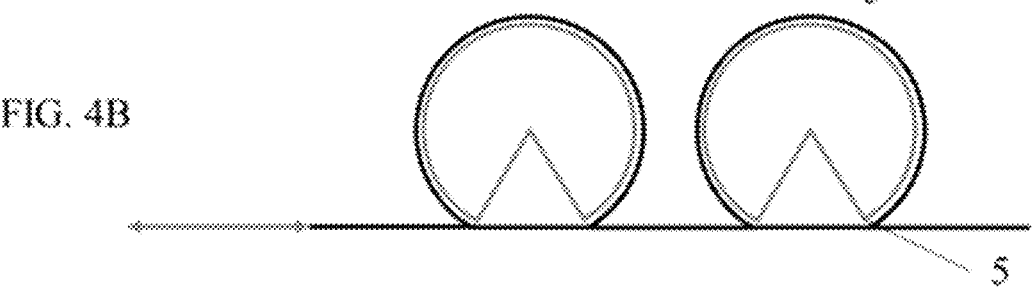
FIG. 4B shows a sectional view of a multi-chambered muscle at a partial stage of contraction, according to an embodiment of the subject invention.
Figure 4C:
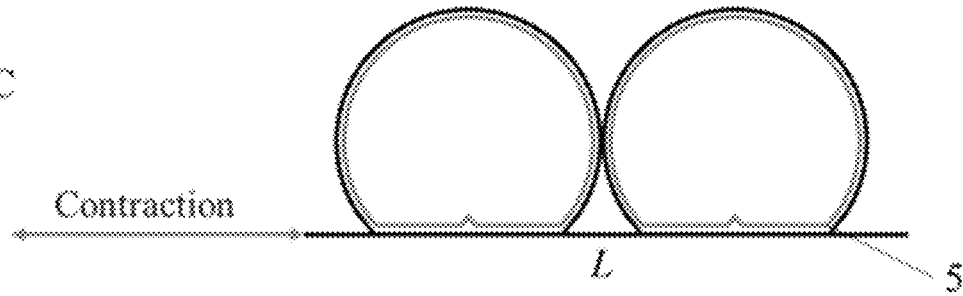
FIG. 4C shows a sectional view of a multi-chambered muscle at a full stage of contraction, according to an embodiment of the subject invention.

As shown in FIGS. 4A-C, in an embodiment, a two-module artificial muscle 15 is formed by simply connecting the corresponding wires of one-module muscle 14. When tension wires 6, 7 are pretensioned, the first and second contact edges 5 can be squeezed closer together and in certain embodiments at minimal contraction, into contact with each other. This state is the original length L_0 of the muscle. After the tube is pressurized, the two contact edges 5 pull tension wires 6, 7 inwards, and the whole artificial muscle shortens and generates output force. Due to the contraction of overall length, the two tubes 1 get close to each other. In certain embodiments, when the tubes 1 each expands to its respective maximum state, the adjacent two tubes 1 can contact with each other, that in certain embodiments defines the final length L of muscle. If longer contraction length is required, simply increasing the number of modules can increase the contraction length (e.g., as shown in FIGS. 5A-C, that illustrates a three-module artificial muscle.) When tubes 1 are depressurized, tubes 1 restore to their initial shape and the muscle moves to its original length L_0.

Figure 10:
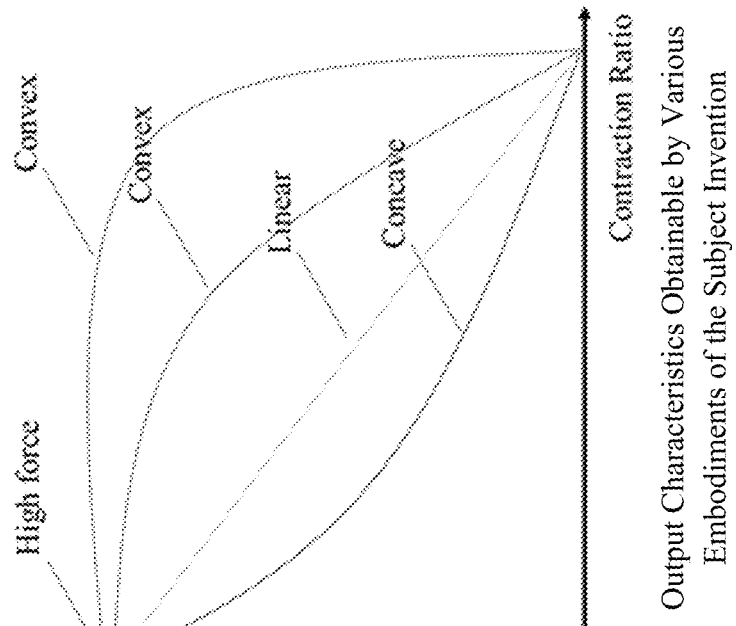
FIG. 10 shows output characteristics of a muscle achieved by changing the parameters of a tube section, according to an embodiment of the subject invention.

In certain embodiments, changing the removed shape 11 in sectional view of tube 1 can obtain various output characteristics. As shown in FIG. 6A, simply changing the offset distance 8 (e.g., the distance from an apex of removed sector 11 to the center of the circle) can achieve a distinct plot of output characteristics. In an embodiment, if offset distance 8 equals 0, the most part of output characteristics of the muscle is flat, a condition that can be advantageous (e.g., for precise control.) In other embodiments when offset distance 8 is not zero, the output characteristics can be tuned to present various phenomenon such as linear, convex, concave and so on as shown in FIG. 10. Other shapes can be removed such as an oval shape as shown in FIG. 6B to achieve specific desired output characteristics.

The output force of the muscle 14, 15 can be related to diameter 13 of sectional view of tube 1 and length 12 of wound part. In various embodiments, simply changing these parameters can generate different ranges of desired or advantageous output characteristics.

Figure 7:
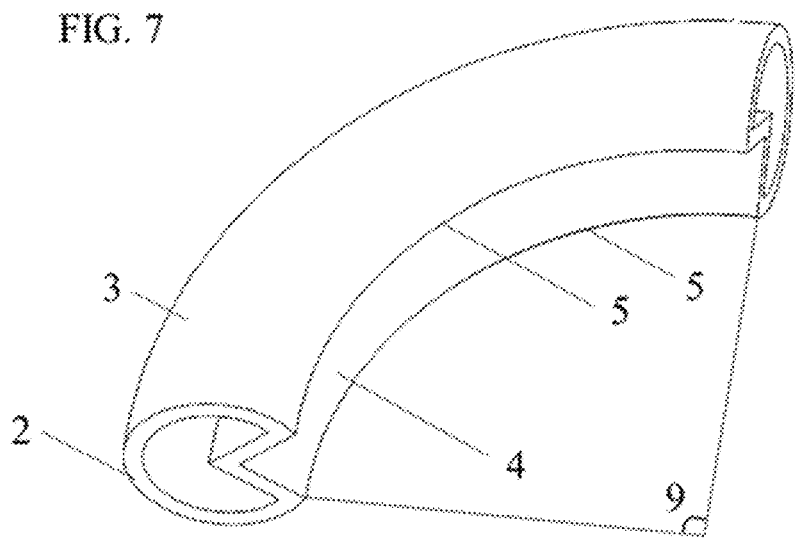
FIG. 7 shows an isometric view of a bent tube in an artificial muscle, according to an embodiment of the subject invention.

As shown in FIGS. 4A-C, the winding methods of embodiments of the subject invention can place expansion of tubes 1 on one side of the muscle. Hence the expansion of tubes can be designed minimize or inhibit expansion on the opposite side of the artificial muscle, a condition that can improve the wearing comfort, range of motion, and user experience. As shown in FIG. 7, in certain embodiments the tube 1 can be bent by angle 9 around side of contact edges 5 to fit the curve of users' skin and the tension wires 6, 7 can be wound as shown in FIG. 3 to achieve greater comfort, control, or force as needed. As a non-limiting example, the angle 9 is shown as 90-degrees in FIG. 7 but could be greater than or less than 90-degrees. Additionally, multiple sections as shown in FIG. 7 can be constructed together with the same or different angles and alignments to create muscles of various shapes and output characteristics useful for a given application.

Figure 8:
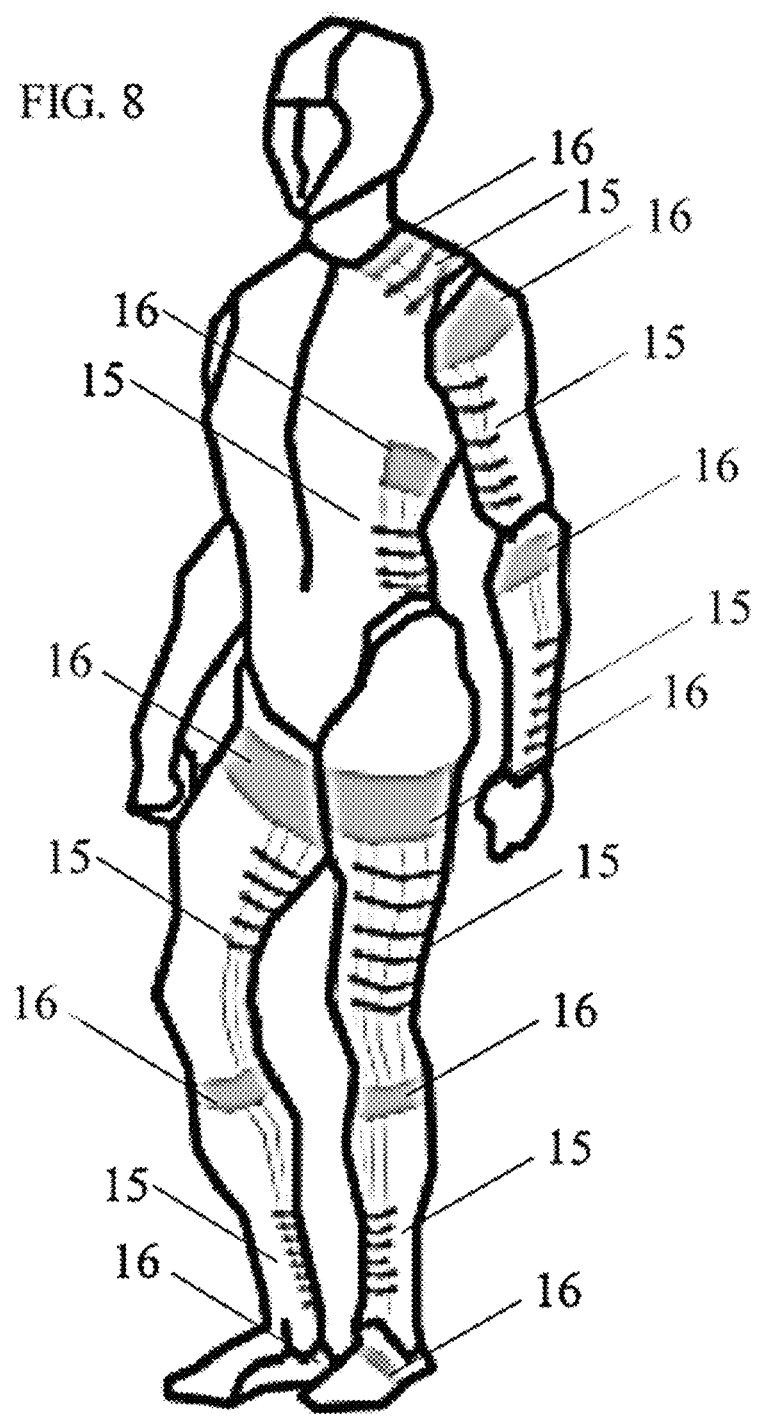
FIG. 8 shows a schematic of wearable applications in various articulus configurations, according to an embodiment of the subject invention.

As shown in FIG. 8, because in certain embodiments the muscle 15 can be made by soft materials and the expansion of tubes 1 can be primarily, generally, or entirely limited to (or concentrated on) one side of tension wires 6, 7 by the winding method (e.g., as shown in FIG. 3), the muscle 15 can be worn (e.g., like clothes, or close-fitting to the users' skin) in different articulus configurations (e.g., acting like a real muscle or a group of muscles). FIG. 8 shows a variety of non-limiting examples of how in certain embodiments the muscle(s) can be worn on shoulder, upper arm, wrist, waist, front thigh, rear thigh, front shank and rear shank to assist whole arm lifting, arm flexion, wrist extension, waist turning, knee extension, knee flexion, plantar lifting, ankle lifting, or other motions. In certain embodiments, the two ends of the muscle 15 can be fixed on fixing strap 16 and the fixing strap can be fixed on different positions to assist movement of corresponding articulus.

Figure 9:
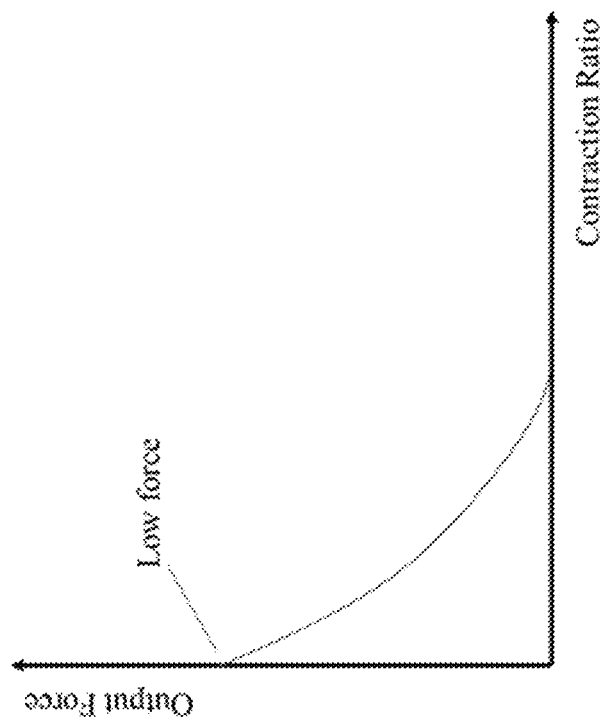
FIG. 9 shows output characteristics of a muscle achieved by related art methods.

As shown in FIG. 9 output characteristics of a muscle achieved by related art methods can have a low force output and smaller contraction ratio.

As shown in FIG. 10 a range of concave, linear, and convex output characteristics of a muscle can be achieved by controlling parameters such as the parameters of a tube section, according to embodiments of the subject invention.

Figure 11B:
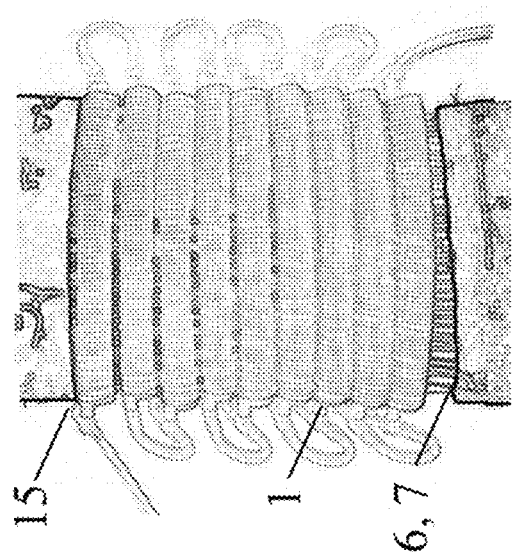
FIG. 11B depicts an artificial muscle actuator in an activated pressurized contracted state, according to an embodiment of the subject invention.
Figure 11A:
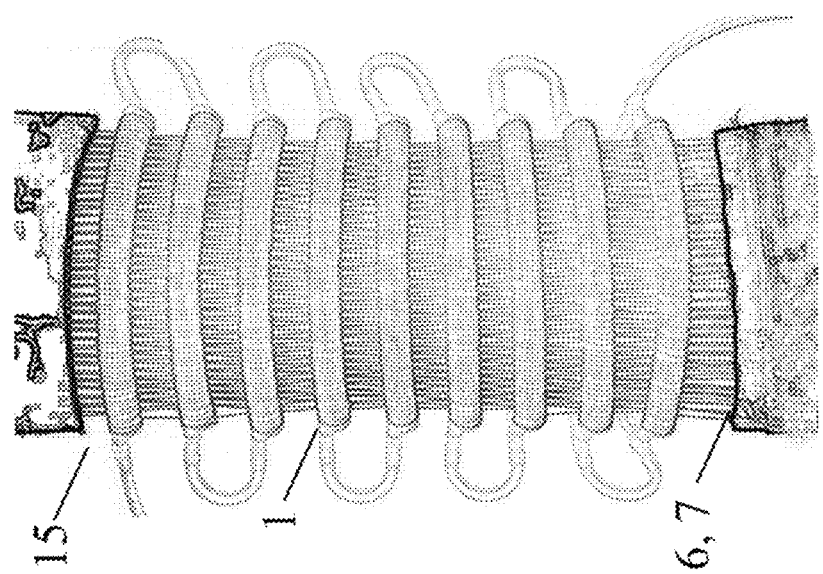
FIG. 11A depicts an artificial muscle actuator in an initial depressurized extended state, according to an embodiment of the subject invention.

As shown in FIGS. 11A-11B an artificial muscle actuator according to an embodiment of the subject invention can have multiple tube sections (e.g., 9 tubes in this embodiment.) Alternatively, embodiments can have 1 tube, or any number of tubes, including for example 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, or more tubes. In certain embodiments the number of tubes can be chosen along with other parameters to advantageously align with the muscle or joint being augmented or replaced. For example, a smaller muscle can have fewer or smaller tubes and a larger muscle can have more or larger tubes.

As also shown in FIGS. 11A-11B an artificial muscle actuator according to an embodiment of the subject invention can have multiple wires (e.g., approximately 70 wires in this embodiment.) Alternatively, embodiments can have 1 wire, or any number of wires suitable to the application, including for example 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, or more wires. In certain embodiments the number of wires can be chosen along with other parameters to advantageously align with the muscle or joint being augmented or replaced. For example, a narrow muscle can have fewer or smaller wires and a wider muscle can have more or larger wires.

As also shown in FIGS. 11A and 11B, pressurization of one or more tubes can generate forces resulting in a contraction of the overall length of an artificial muscle in accordance with an embodiment of the subject invention.

As shown in FIGS. 12A-12D selected modelling parameters according to an embodiment of the subject invention can be defined as discussed in greater detail within the examples.

Figure 13B:
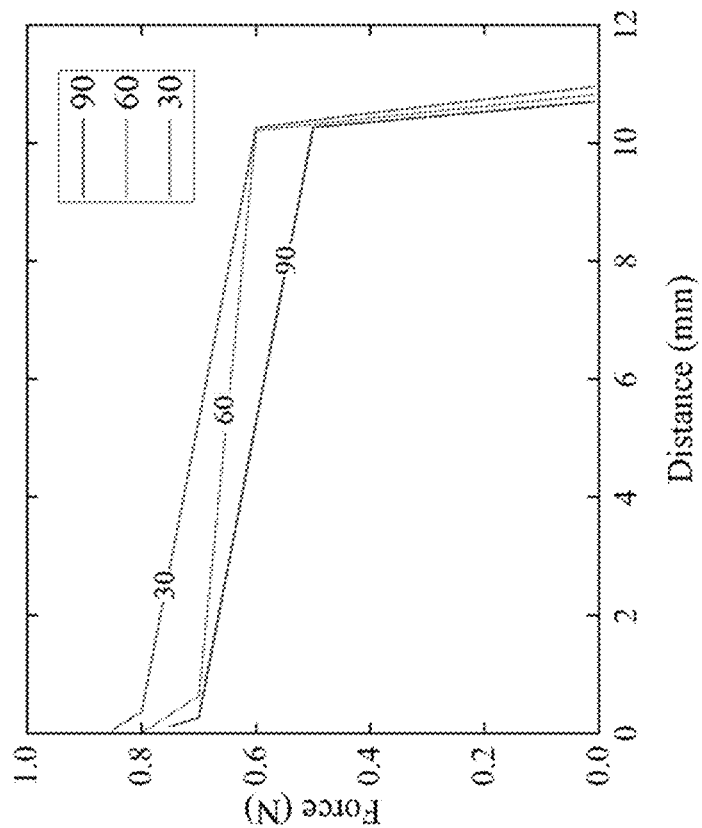
FIG. 13B depicts a plot of a Finite Element Method (FEM) analysis result showing a change of output force with displacement distance, according to an embodiment of the subject invention.
Figure 13A:
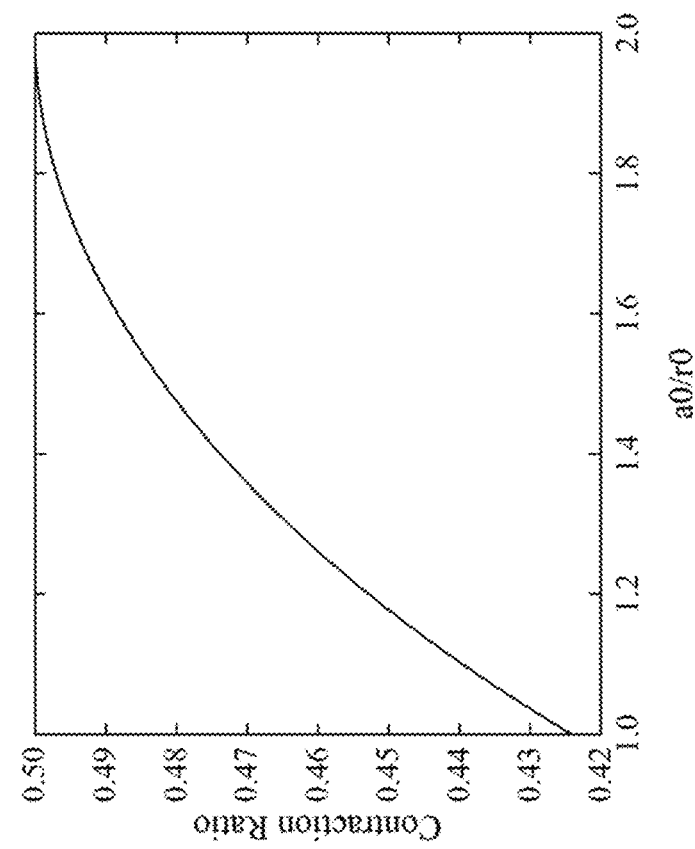
FIG. 13A depicts a plot of maximum contraction ratio changing with $a_0/r_0$, according to an embodiment of the subject invention.

As shown in FIG. 13A a plot of maximum contraction ratio changing with a ration such as a_0/r_0, according to an embodiment of the subject invention, can be increasing and concave-down.

As shown in FIG. 13B a plot of a Finite Element Method (FEM) analysis result can show a change of output force with displacement distance for different pre-opening angles, according to an embodiment of the subject invention, with 30 degrees pre-opening angle producing a force greater than 60 degrees pre-opening angle and 60 degrees pre-opening angle producing a force greater than 90 degrees pre-opening angle across the tested range of contraction distances. In this embodiment each respective pre-opening angle tested advantageously produced a relatively linear and relatively flat output force across a range of contraction distances.

Figure 14:
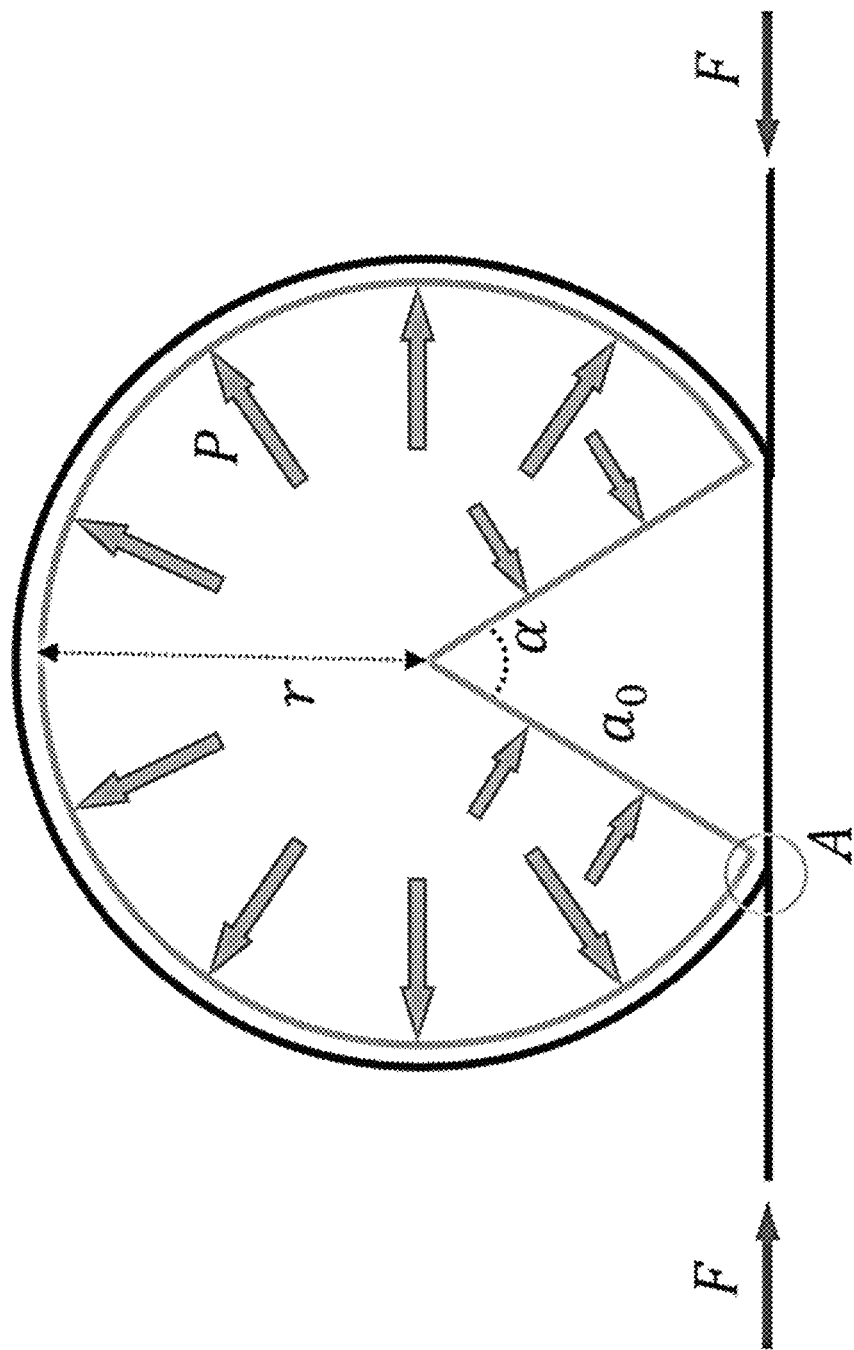
FIG. 14 depicts selected parameters in a simplified force model of an artificial muscle actuator, according to an embodiment of the subject invention.

As shown in FIG. 14 a simplified force model according to an embodiment of the subject invention can illustrate certain mechanisms and parameters wherein pressure within a tube translates into force or tension in one or more tension wires wrapped around that tube.

Figure 15:
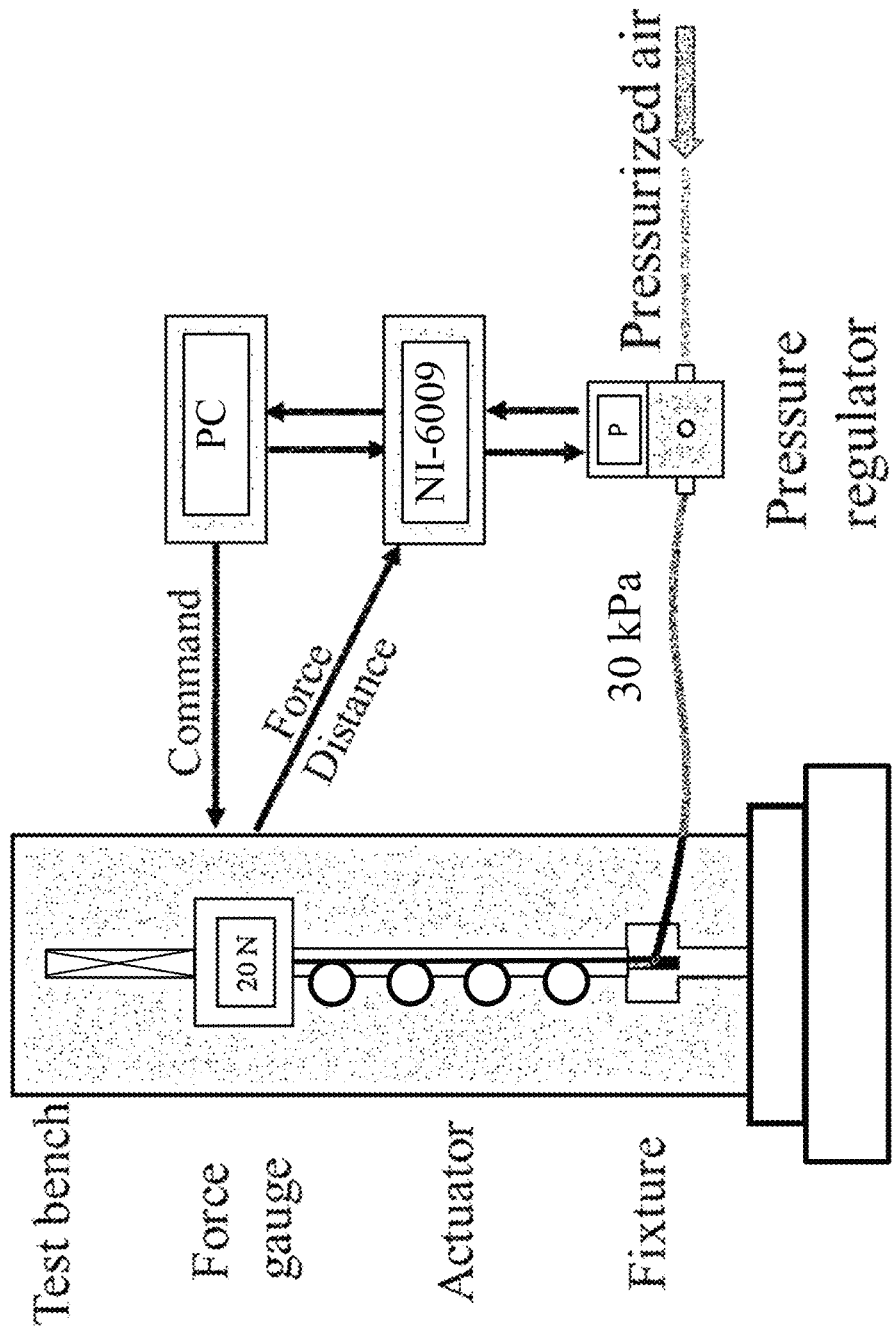
FIG. 15 depicts a reciprocating test bench for acquiring force and displacement of an artificial muscle actuator, according to an embodiment of the subject invention.

As shown in FIG. 15 a test setup (e.g., a reciprocating test bench for acquiring force and displacement of an artificial muscle actuator) can be advantageously applied according to an embodiment of the subject invention to measure outputs such as force over distance.

Figure 16A:
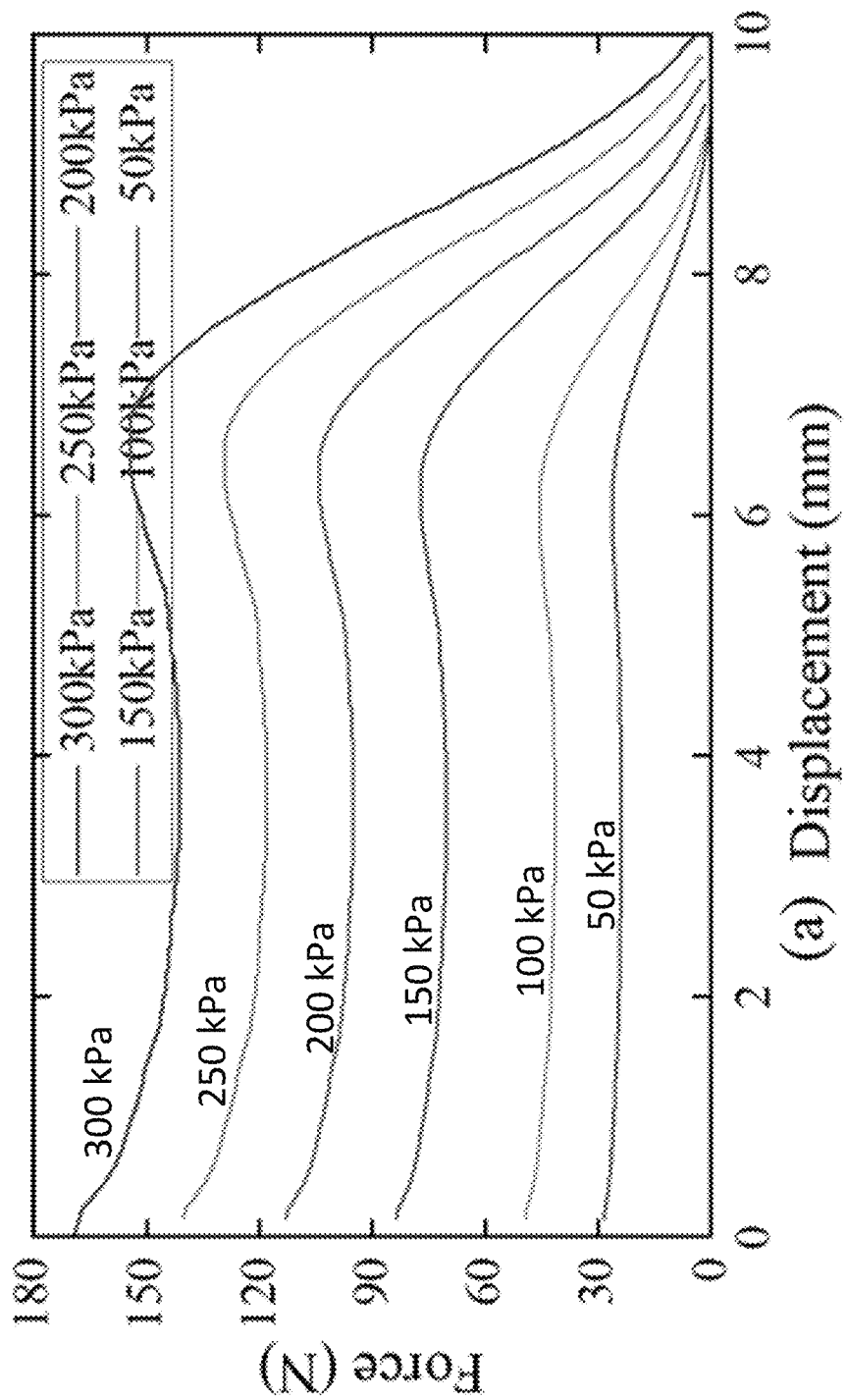
FIG. 16A depicts a plot of selected force vs displacement output characteristics for a variety of applied pressures of an actuator with one module, according to an embodiment of the subject invention.
Figure 16B:
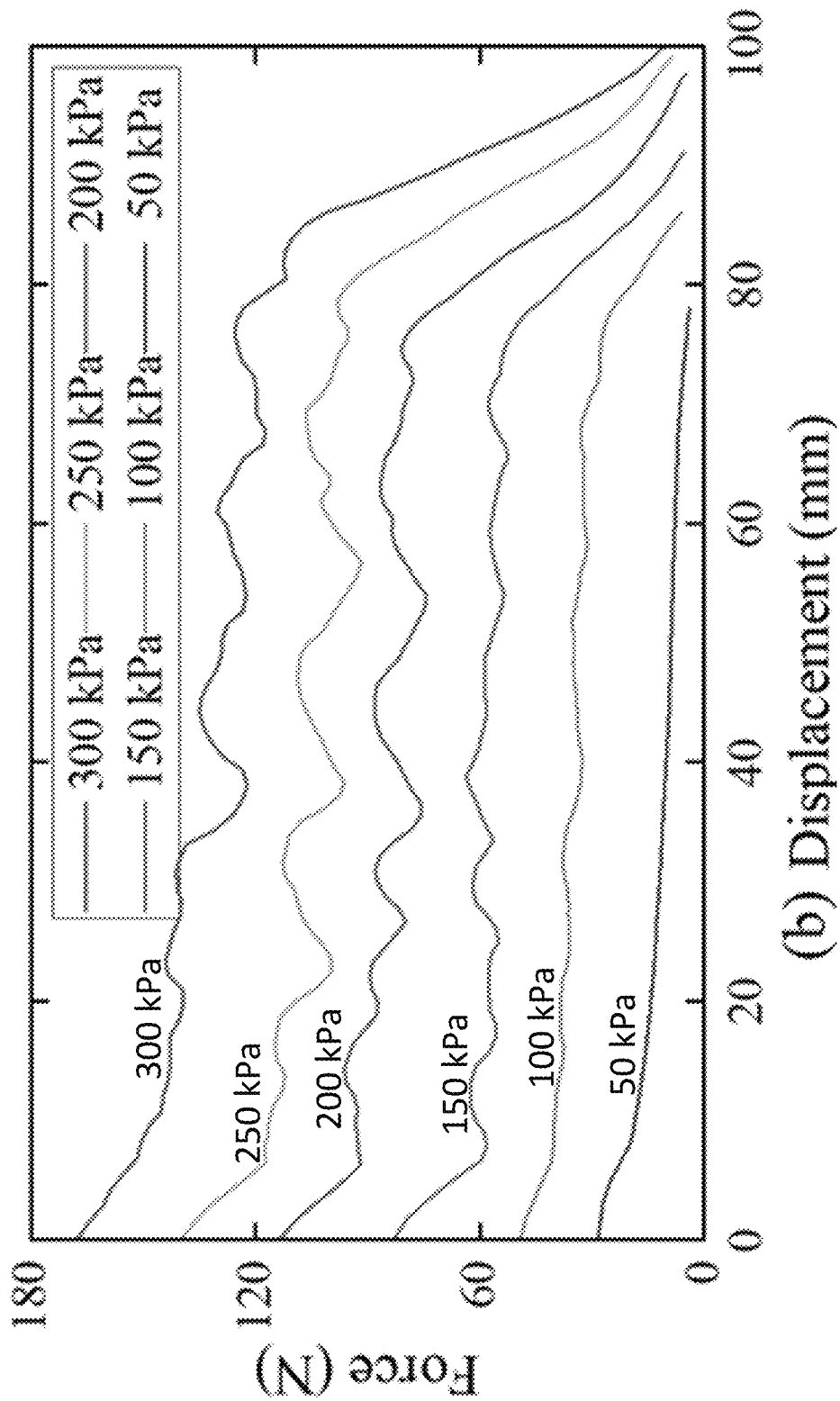
FIG. 16B depicts a plot of selected force vs displacement output characteristics for a variety of applied pressures of an actuator with ten modules, according to an embodiment of the subject invention.

As shown in FIGS. 16A-16B a plot of selected force vs displacement output characteristics for a variety of applied pressures of an actuator with one module, according to an embodiment of the subject invention is similar to a plot of selected force vs displacement output characteristics for a variety of applied pressures of an actuator with ten modules, according to an embodiment of the subject invention. The actuator with ten modules produced displacement roughly ten times greater than the actuator with one module.

As shown in FIGS. 17A-17B an artificial muscle actuator configured to produce or assist shoulder flexion according to an embodiment of the subject invention has been built and tested on a human subject. This embodiment used 11 tubes of similar size to mimic a shoulder muscle.

Figure 18A:
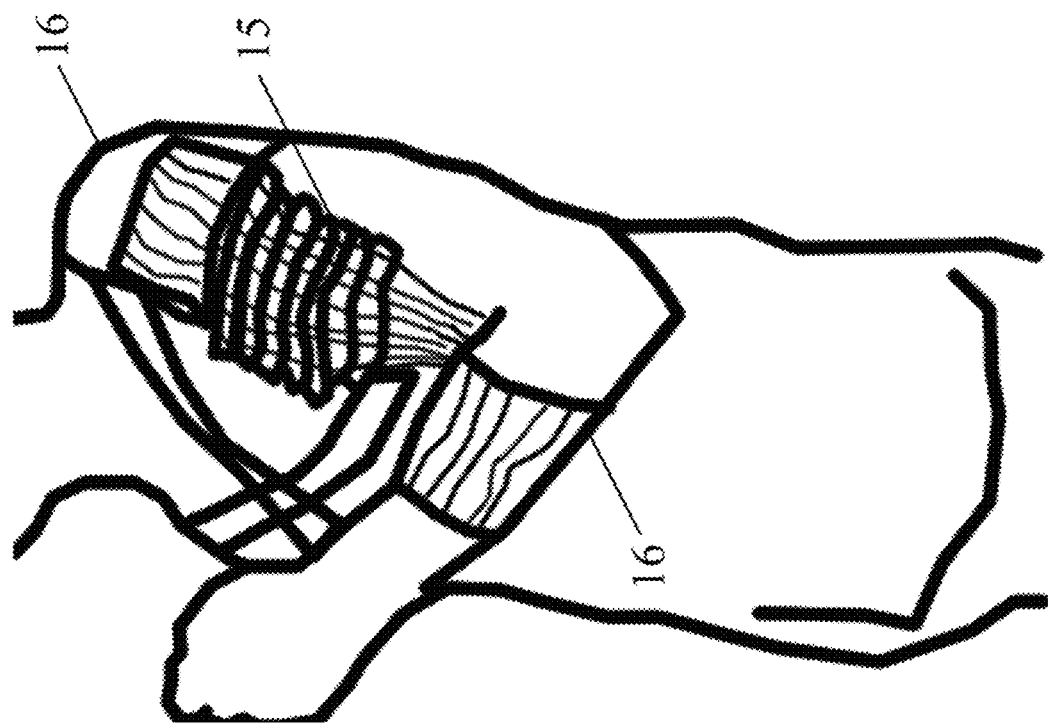
FIG. 18A depicts an artificial muscle actuator configured to produce or assist arm flexion in an initial depressurized extended state, according to an embodiment of the subject invention.
Figure 18B:
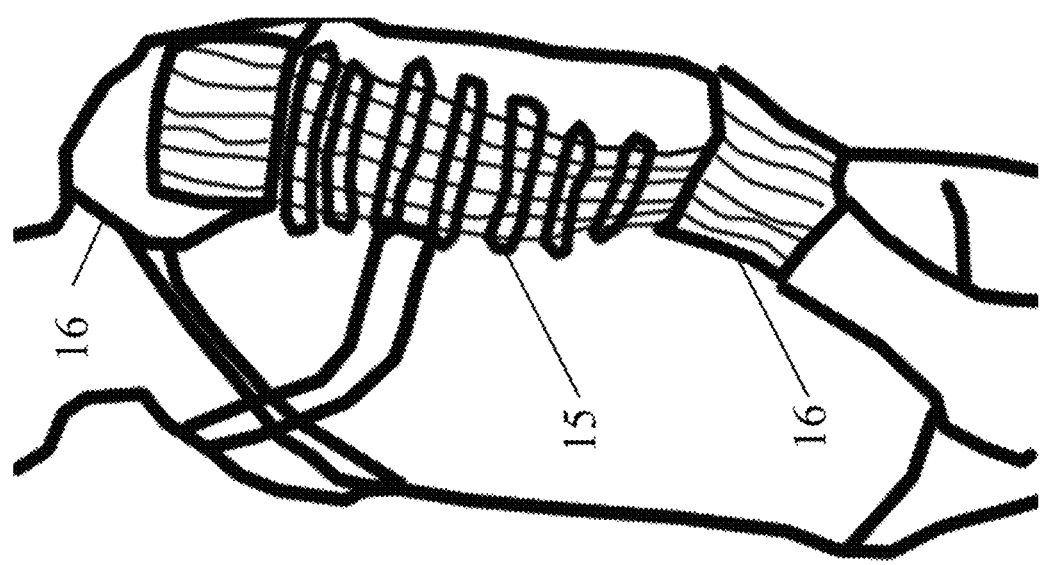
FIG. 18B depicts an artificial muscle actuator configured to produce or assist arm flexion in an activated pressurized contracted state, according to an embodiment of the subject invention.
Figure 18C:
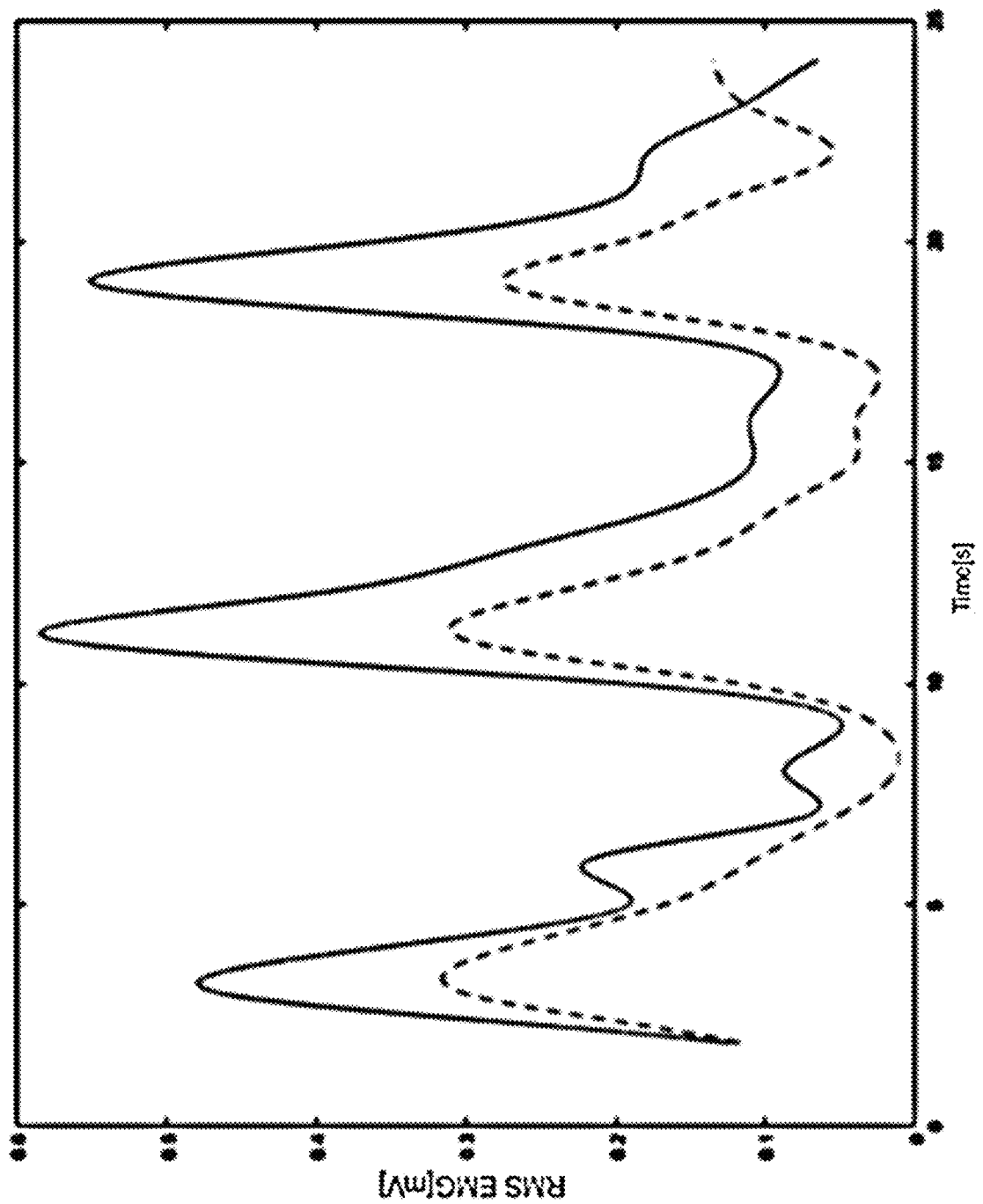
FIG. 18C depicts a plot of RMS EMG [mV] over time [seconds] for several contractions of an artificial muscle actuator configured to produce or assist arm flexion, according to an embodiment of the subject invention.

As shown in FIGS. 18A-18B an artificial muscle actuator configured to produce or assist arm flexion according to an embodiment of the subject invention has been built and tested on a human subject. This embodiment used 11 tubes of varying size to mimic an arm muscle.

In related art, one widely used pneumatic artificial muscle is the McKibben muscle. Braided net is used to wrap an inflatable tube, so that the radial expansion of tube is transformed into axial contraction. To achieve a higher contraction ratio, the radial expansion of the muscle is often large. When close fitted, the muscle expansion can intervene against certain movements of user. In addition, the stiffness increasing during pressurization can cause additional discomfort to the user when worn close to body. Compared with McKibben muscle, the densely wound wire of the subject invention puts the expansion of tube 1 on one side of tension wires 6, 7, inhibiting the tendency to squeeze the wearer's skin to cause discomfort, pain, or reduced range of motion. Therefore, embodiments of the subject invention are suitable for close fitting applications with reduced impact to the movement range of user. Meanwhile, the modular design of certain embodiments enables reduced increasing of stiffness of the muscle when pressurized, that further improves the comfort of the artificial muscle, especially when worn closely to body. Because in certain embodiments the curve of output characteristic is adjustable by simply changing the sectional view and shape parameters of the tube, the appropriate shape can be selected according to body part to be assisted to achieve a more flexible and optimal design.

The artificial muscle in U.S. Pat. No. 8,349,020B2 has a flexible chamber and tendons. When pressurized, the diameter of the chamber increases. This increasing of diameter brings hysteresis of friction. Whereas in embodiments of the subject invention, the tube with removed sectional shape can only or primarily pull the tension wires by the two contact edges 5. Hence, the hysteresis caused by friction is reduced, inhibited, or wholly or partially avoided. Moreover, with various sectional shapes applied to certain embodiments, different output characteristics can be obtained. For comparison to related art, the tendons in U.S. Pat. No. 8,349,020B2 is wide, by conducting FEM analysis and experiment, this structure can be seen to exhibit stress concentrations (e.g., on the edge of the tendons) where force transmission can be concentrated along the edge of the tendons, negatively impacting the output force of the structure. Whereas in embodiments of the subject invention densely wound wires can be used to transmit force and the output efficiency of the overall muscle can be improved. The same is true for the diameter increasing and wide tendons of the traction cylinder taught in U.S. Pat. No. 3,570,814. A comparison of related art systems and methods as compared to certain non-limiting embodiments of the subject invention is shown in FIGS. 9-10.

Embodiments can provide adjustable length, thickness, output characteristics, high flexibility, and comfort for motion assistance on most joints. Hence, for subjects (e.g., human or animal patients) with common motor function injury or subjects (e.g., humans or animals) requiring movement assistance to transfer heavy weight objects or persons such as health care workers, embodiments of the subject invention can provide advantageous benefits.

A prototype of a muscle according to an embodiment of the subject invention has been manufactured and tested to verify its functionality.

Specific exemplary and non-limiting embodiments of the subject invention can include, but are not limited to:

Embodiment 1. An artificial muscle comprises cylindrical tubes and wires wound around them.

Embodiment 2. An artificial muscle as in Embodiment 1, wherein the generally cylindrical tube has different sectional removed shape for achieving various output characteristics and can expand in different ways after being pressurized.

Embodiment 3. An artificial muscle as in Embodiment 1, wherein the non-stretchable wires are densely wound around the tubes alternately clockwise and counterclockwise to transfer the inflation of tubes to contraction motion of the whole muscle and the inflation of tubes are put on one side of wires.

Embodiment 4. An artificial muscle as in Embodiment 2, wherein the sectional removed shape of the cylindrical core can be fan-shaped, round, square and other shapes.

Embodiment 5. An artificial muscle as in Embodiment 4, wherein when the tube is depressurized, the tube restore to its initial shape and the muscle moves to its original length.

Embodiment 6. An artificial muscle as in Embodiment 4, wherein the output characteristics can be adjusted according to the sectional removed shape of the tubes to adapt to various application conditions.

Materials and Methods

All patents, patent applications, provisional applications, and publications referred to or cited herein are incorporated by reference in their entirety, including all figures and tables, to the extent they are not inconsistent with the explicit teachings of this specification. Following are examples that illustrate procedures for practicing the subject invention. These examples should not be construed as limiting.

EXAMPLE 1—CONSTRUCTION, ANALYSIS, MODELLING, AND TESTING OF AN ARTIFICIAL MUSCLE

Tubes were digitally modelled and then 3D-printed utilizing a thermoplastic polyurethane (TPU) material with shore hardness rating of 83A (eFlex, Shenzhen eSUN Industrial Co., Ltd, Nanshan District, Shenzhen, China). In other embodiments blow molding can be used as an alternative manufacturing method. Wires were densely wound on tubes alternating in clockwise and counterclockwise directions and glued to the walls of individual tubes. Air supply lines were connected to each individual tube, in series. Views of the completed actuator in depressurized and pressurized states are shown in FIGS. 11A-11B.

FIGS. 12A-12D define a model with selected characteristic variables for a two-module embodiment of an actuator according to the subject invention. The variables are represented in schematic of sectional views of (12A) an original or non-pressurized state where an apex of the removed section is aligned with a center of the tube cross section, o; (12B) an initial, compressed, or pre-stretching depressurized state where the apex is above (to the left in this view orientation) the center; (12C) an intermediate pressurized or partially pressurized state where the apex is below (to the right in this view orientation) the center; and (12D) a final fully pressurized state where the apex is extended to contact or nearly contact the tension wires.

Embodiments can advantageously provide a displacement model of the actuator as described in the following paragraphs.

Figure 12A:
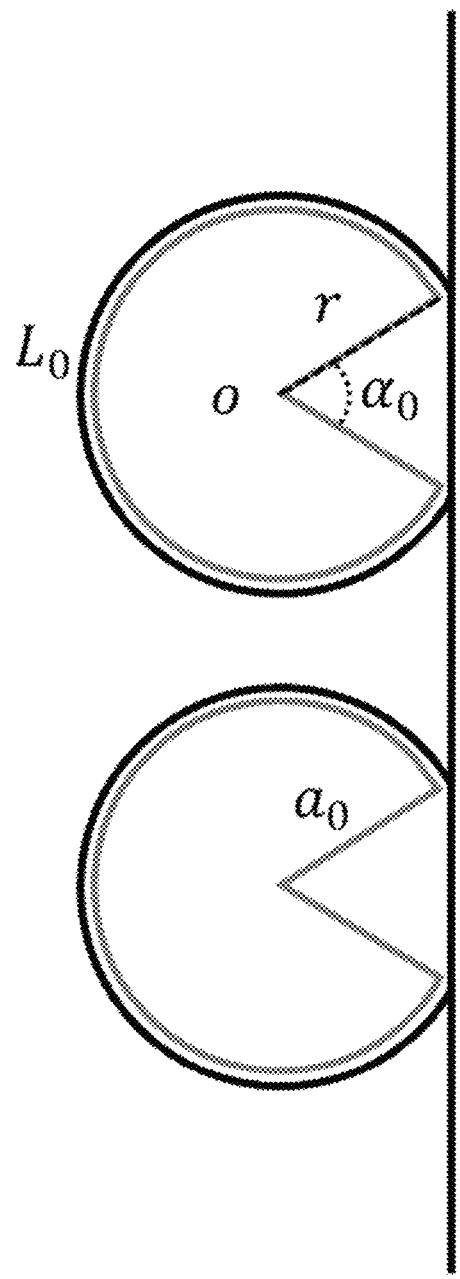
FIG. 12A depicts selected modelling parameters of a two-module artificial muscle actuator in a partial stage of contraction, according to an embodiment of the subject invention.
Figure 12B:
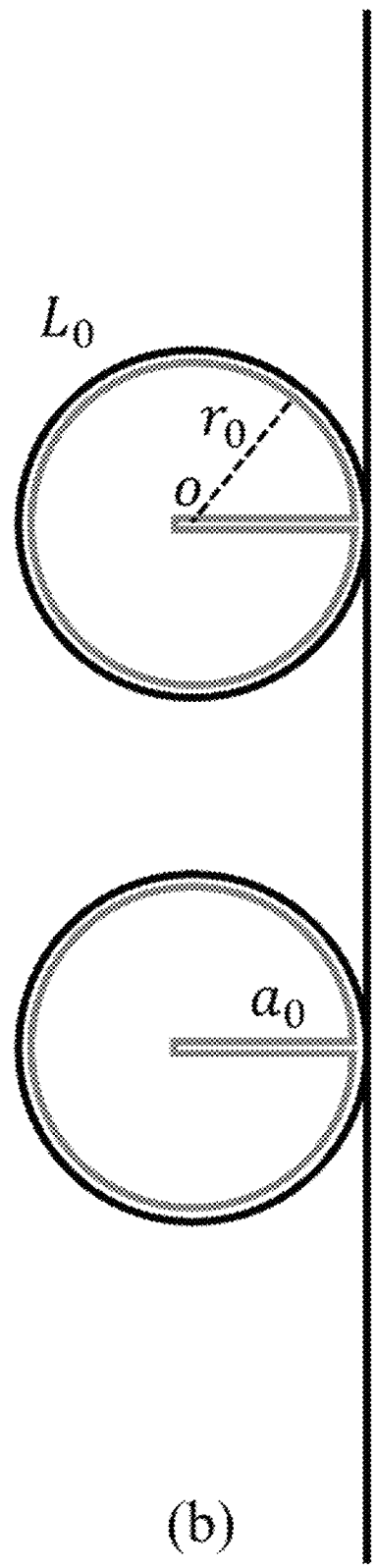
FIG. 12B depicts selected modelling parameters of a two-module artificial muscle actuator at minimal contraction in an extended, relaxed, or depressurized state, according to an embodiment of the subject invention.

To simplify the model, in certain embodiments only a sectional view of the actuator is considered as shown in FIGS. 12A-12D. I this example, without generality, an actuator with two modules is considered. Certain assumptions in the following calculation include: the remaining arch of the circumference on bottom L_0 (approaching a_0) maintains the shape of a part of a circle up to a sharp corner. The edges on bottom a_0 keep straight during inflation and the section is constant along a length direction perpendicular to the section view (e.g., in and out of the page in FIGS. 12A-12D.) As shown in FIG. 12A an original state of the actuator with a concentric sector removed from the bottom forms an opening with pre-opening angle of α_0. The opening has two edges facing the bottom with length of a_0 and remaining arch on bottom with length of L_0. As shown in FIG. 12B an initial length of the actuator is achieved when the tubes are depressurized and the wires are pretensioned to their longest state (i.e., the edges on bottom are in contact with each other.) In this state the radius of initial circle r_0 is:

$$r_0 = \frac{L_0}{2\pi}$$

Figure 12C:
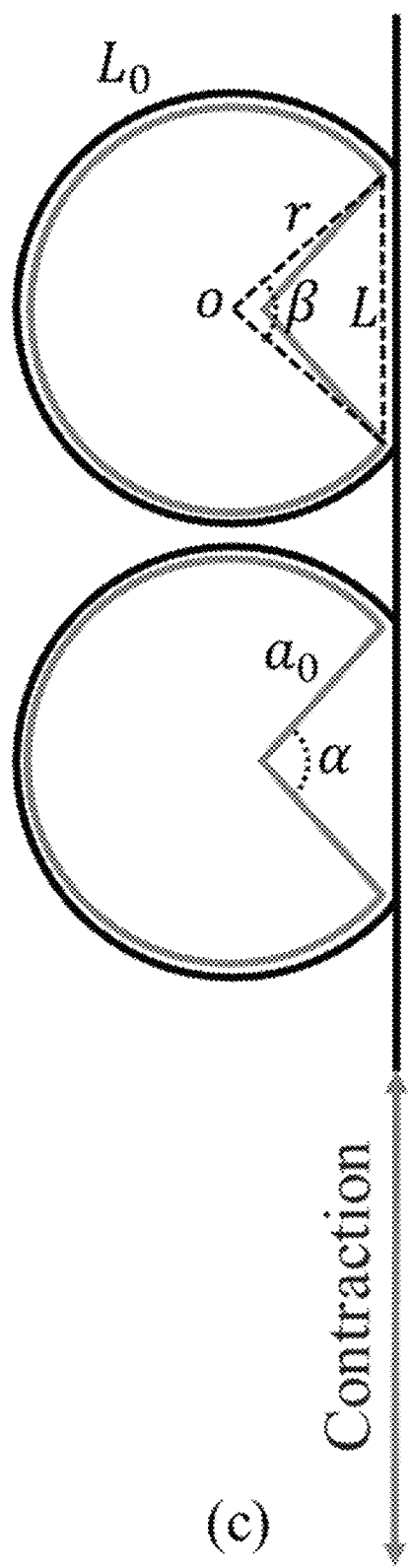
FIG. 12C depicts selected modelling parameters of a two-module artificial muscle actuator at a partial stage of contraction, according to an embodiment of the subject invention.

When pressurized, the Tube expands to a certain shape as shown in FIG. 12C with an opening angle of α, α∈(0,π/2). And the radius of the remaining arch on bottom now is r and the center angle corresponding to the opening of the removed section is β. The linear distance between the corners A, B of the opening is L that equals to displacement of the actuator caused by this one tube. The relation between opening angle of a and center angle corresponding to opening β is shown as following:

$$L = 2a_0 \sin \alpha/2$$

$$r = \frac{L}{\sin \beta/2}, \alpha \in [0, \pi]$$

$$2\pi r + \beta r = L_0$$

The contraction ratio δ now is $$\delta = \frac{L}{L + 2r}$$

When α=π/2, the maximum contraction ratio changing with the ratio between (a_0/r_0), a_0∈[0,2r_0], i.e., the pre-opening angle α_0 can be calculated as shown in FIG. 13A.

Figure 12D:
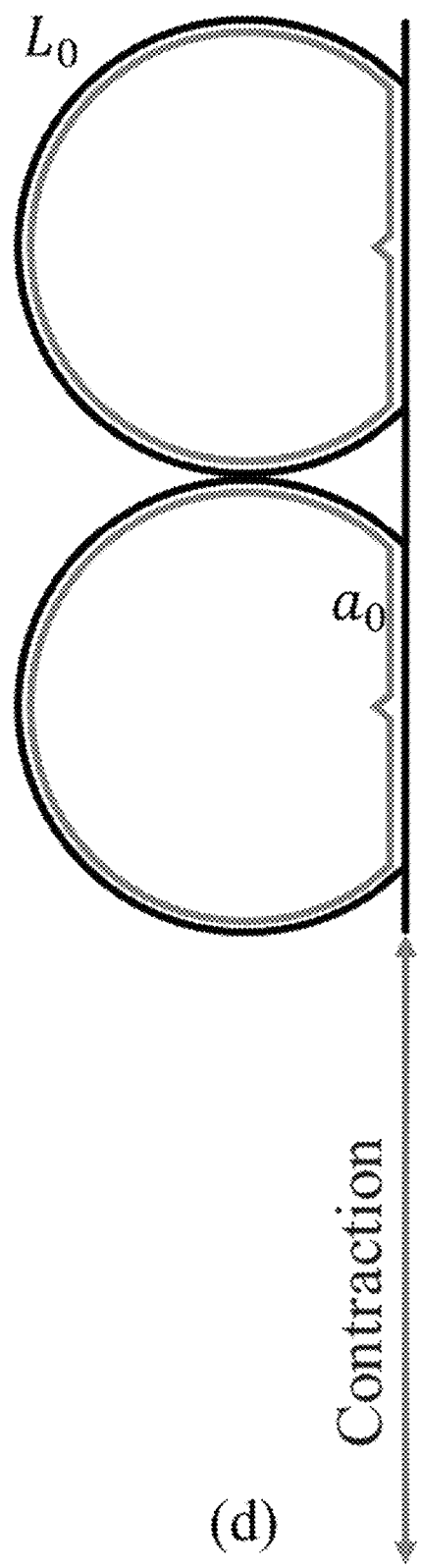
FIG. 12D depicts selected modelling parameters of a two-module artificial muscle actuator at a full stage of contraction, according to an embodiment of the subject invention.

The original or non-pressurized state (i.e., without any pressure or external forces) of the tube has an open angle (i.e., the center angle of the removed sector), which is called the pre-opening angle, as shown in and FIG. 12A. The original or non-pressurized state of the tube typically differs from the intermediate state of the tube and the compressed state of the tube because the compressed state and the intermediate state, respectively, are driven by external forces. FIG. 12B show the compressed or pre-stretching state, where forces (e.g., compressive forces) act from the wires on the tube to close the opening angle and make the tube edges contact with each other. On pressurization of the tube, the tube stretches to an intermediate state shown in and FIG. 12C and finally to a final state as shown in FIG. 12D.

In certain embodiments, when the ratio (a_0/r_0) or pre-opening angle increases, the maximum contraction ratio increases to 50%. However, with the increasing of the ratio (a_0/r_0) or pre-opening angle, the output characterization also changes.

Embodiments can advantageously provide a force model of the actuator as described in the following paragraph.

Because of its high nonlinearity and complex structure, it is difficult to model the actuator directly. Therefore, a simplified finite element method (FEM) model is advantageously employed to reduce calculation requirements and facilitate convergence to a solution. Because wires are wound by the same tension ideally, and only one wire is wound around each tube per unit length, the force model can be simplified by assuming plane strain in ABAQUS. Only a section of Tube with unit thickness, a_0=5 mm and pre-opening angles of 30°, 60°, and 90° is considered, on that a wire with a diameter of 0.5 mm is wound. Binding contact is adopted in the model between the wire and the surface of Tube to simulate the bonding state between them. The analysis proceeds in two steps. First, apply force to both ends of the wire in Step 1 to pull two edges on bottom to contact with each other, and then apply pressure to inner wall in Step 2 to obtain the output curve of the actuator in unit thickness. As shown in FIG. 13B, except that the force at each of the beginning section and the last section, respectively, decreases, the middle section of displacement remains linear and nearly constant with a modest slope, that is an excellent property for control and is verified and discussed below. In this embodiment, when the pre-opening angle equals 60°, the middle section of the force output response is flatter and more constant.

Guided by these FEM results, for certain embodiments a value of quasi-constant force in middle range displacement at corresponding pressure and displacement can be obtained, and the design can be further facilitated.

Embodiments can advantageously provide a simplified force model of the actuator as shown in FIG. 14 and described in the following paragraphs.

Because the output force is quasi-constant during the middle of the displacement range, any state within this range can be selected to be modelled. Hence, selecting a state where constraint definition is simplified can be advantageous. It is observed that at the natural state of the tube (e.g., where internal pressure equals outside or atmospheric pressure and the tube is not significantly deformed), the constraints are more easily defined without any elastic deformation. At point A shown in FIG. 14, according to force balance:

$$F = PL_w(r + a_0 \cos \alpha/2) - PL_w a_0 \cos(\alpha/2)$$

where L_w is the width of the tube.

To characterize the relations between force and displacement of the actuator, an actuator with one module with diameter of 10 mm at original state, opening angle of 60° and width of 80 mm was tested on a test bench as shown in FIG. 15. The pressure of the actuator is controlled by a pressure regulator (ITV2050, SMC Corporation, Tokyo, Japan). One of the actuator ends is connected to the force gauge of the bench, the other actuator end is fixed on the fixture. The test bench drives the actuator with a speed of 5 mm/min and the output force, distance is captured and recorded by an acquisition card (NI-6009, NI, Austin, TX).

FIG. 16A shows the output characteristics (force vs. displacement) of a one module actuator at various pressures. In this embodiment the actuator shows a phenomenon that in approximately 80% of the distance the output force is constant within an error 10% i.e., the output force at certain pressure can be considered as a constant that is an advantage for controlling.

An actuator with ten modules is characterized as shown in FIG. 16B. In this embodiment the output force keeps quasi-constant over most of the range of displacement. However, there are several fluctuations in the plot. The phenomenon is caused by the differences among modules. Some modules are stiffer, whereas some are softer. Hence, they inflate one by one and not simultaneously.

Figure 17C:
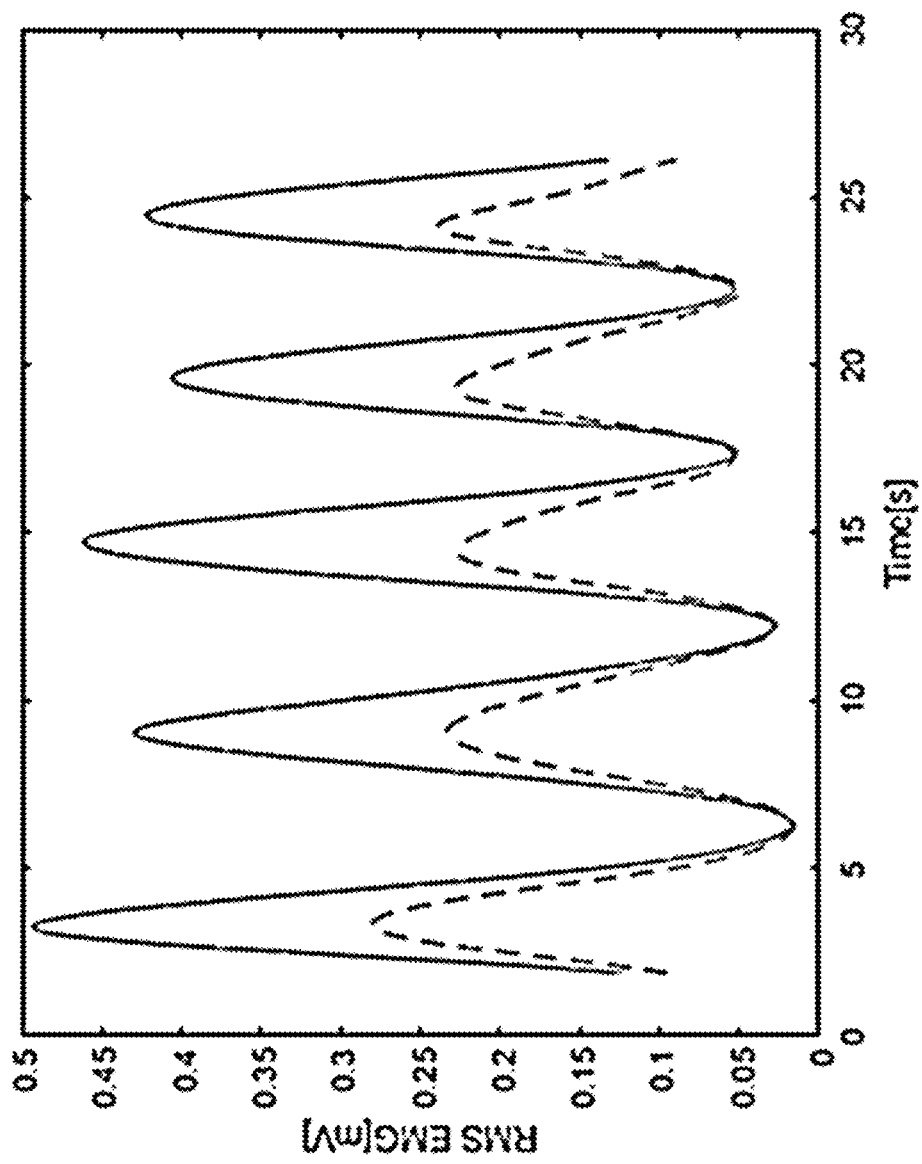
FIG. 17C depicts a plot of RMS EMG [mV] over time [seconds] for several contractions of an artificial muscle actuator configured to produce or assist shoulder flexion, according to an embodiment of the subject invention.

A first actuator according to a first embodiment of the subject invention was built for shoulder flexion as shown in FIGS. 17A-17B. When testing on shoulder flexion, the arm of the test subject provided the lifting load. The actuator was driven at a pressure of 300 kPa and the result in FIG. 17C shows that the actuator reduced muscle effort of middle deltoid by 41.2% (the difference between the solid curve and the dashed curve.)

RMS EMG data is reported because data measured by an EMG sensor can exhibit significant noise, so post processing is advantageous. The RMS EMG method used here calculates the root mean square of the data covered by a window around each data point, and then moves this window from the first data point to the last data point to obtain the RMS EMG plot from the original raw data set.

The EMG sensor used for this example was a Biosignalsplux Electromyography (EMG) sensor (PLUX wireless biosignals, S.A., Portugal.) EMG sensor placement was on the skin at each respective corresponding muscle position.

Dashed lines were obtained by test subject moving the corresponding muscle without the assistance of the artificial muscle. Solid lines were obtained by test subject moving the corresponding muscle with the assistance of the artificial muscle. For shoulder testing, the test subject first raises and lowers the shoulder joint at a constant speed, and then puts on the artificial muscle to repeat the process. For lifting load testing, the test subject first grabs the weight, then raises and lowers it at a constant speed, and then puts on artificial muscles to repeat the process.

In this test, a total of 20 cycles were performed. To enhance visibility, fewer cycles are shown in the plot.

Instructions were provided to test subject that during testing, only the specific muscles to be tested should move, and the other muscles should remain in their original position.

A 2.5 kg weight is used in the lifting load (but not in shoulder flexion.) The 2.5 kg weight is not shown in the figures.

A second actuator according to a second embodiment of the subject invention was built for arm lifting as shown in FIGS. 18A-18B. When testing on arm flexion, a 2.5 kg weight was fixed on the hand of the test subject. The actuator was driven at a pressure of 300 kPa and the result shows that the actuator reduced muscle effort of the biceps 40% (the difference between the solid curve and the dashed curve.)

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the subject invention without limitation thereto.

We claim:

1. An artificial muscle comprising:
   a hollow pressurized expansion tube having a length and an outer radius and configured to change shape with pressurized expansion to transition the artificial muscle between a relaxed low-pressure state and a contracted high-pressure state,
   the expansion tube comprising a generally cylindrical convex outer bearing surface extending along the length and around a first portion of the radius,
   the bearing surface interrupted by a removed shape along at least a majority of the length and around a second portion of the radius,
   the removed shape defining a first contact edge, a second contact edge, and a concave opening surface therebetween; and a tension wire comprising a first end extending in a first direction, a second end extending in a second direction opposed to the first direction, and a middle portion therebetween, the middle portion in contact with the bearing surface, the first contact edge, and the second contact edge, the middle portion not in contact with the opening surface in the relaxed low-pressure state, the tension wire being a first tension wire wound in a clockwise direction around the expansion tube; the muscle further comprising a second tension wire wound in a counterclockwise direction around the expansion tube;

wherein the first tension wire is adjacent the second tension wire, creating a wound set of tension wires.

2. The muscle according to claim 1, wherein the middle portion is in contact with the opening surface in the contracted high-pressure state.

3. The muscle according to claim 1, the opening surface being fully contained within and spaced apart from the outer radius between the first contact edge and the second contact edge.

4. The muscle according to claim 3, wherein the expansion tube is configured to produce a specified motion between the first contact edge and the second contact edge with pressurized expansion of the tube.

5. The muscle according to claim 4, the expansion tube being a first expansion tube, the muscle further comprising a second expansion tube; and the muscle being configured to create a specified output characteristic of the muscle with pressurized expansion in the first expansion tube or the second expansion tube, or both;

wherein the specified output characteristic of the muscle produces a curve of output force versus contraction ratio that is linear or convex.

6. The muscle according to claim 5, wherein the specified output characteristic of the muscle produces a curve of output force versus contraction ratio that is convex.

7. The muscle according to claim 3, the first end of the first tension wire, the second end of the first tension wire, the first end of the second tension wire, and the second end of the second tension wire each being wound on the same side of the expansion tube as the opening surface.

8. The muscle according to claim 7, the removed shape being generally fan-shaped, round, oval, elliptical, square, wedge, triangular, rectangular, rectilinear, curvilinear, polygonal, or irregularly shaped.

9. The muscle according to claim 8, the removed shape having an apex defining a minimum offset distance measured from an axis of the outer bearing surface in the direction of the removed shape in the relaxed low-pressure state.

10. The muscle according to claim 9, the minimum offset distance being effectively zero.

11. The muscle according to claim 9, the minimum offset distance being greater than zero.

12. The muscle according to claim 9, the minimum offset distance being less than zero.

13. A method of contracting an artificial muscle, the method comprising:

providing at least one tension wire wrapped around at least one inflatable expansion tube having a generally convex outer bearing surface, the bearing surface interrupted by a removed shape defining a first contact edge, a second contact edge, a contact edge distance therebetween, and a concave opening surface therebetween;

wrapping the wire around the tube such that:

a middle portion of the wire is in contact with the bearing surface, the first edge, and the second edge, a first transitional portion of the wire extends from the middle portion at the first edge past the second edge, crossing a first region of the removed shape while maintaining a first separation distance between the wire and the opening surface throughout the first region of the removed shape, a second transitional portion of the wire extends from the middle portion at the second edge past the first edge, crossing a second region of the removed shape while maintaining a second separation distance between the wire and the opening surface throughout the second region of the removed shape, a first end of the wire extends a first extension distance beyond the first transitional portion, and a second end of the wire extends a second extension distance beyond the second transitional portion, defining a first muscle length between the first end and the second end; and inflating the inflatable expansion tube to cause a change in shape of the tube that increases the contact edge distance, thereby pulling the first end of the wire closer to the second end of the wire to define a second muscle length that is less than the first muscle length, thus contracting the artificial muscle;

wherein at least a portion of the pulling of the first end of the wire closer to the second end of the wire occurs substantially without sliding contact between the wire and the opening surface.

14. The method according to claim 13, wherein the wire is a first wire, wound in a clockwise direction around the tube, and the muscle further comprises a second wire wound adjacent the first wire in a counterclockwise direction around the tube.

15. The method according to claim 14, wherein the tube is a first tube, and the muscle further comprises a second tube positioned on the same side of the first wire and the second wire, wherein the first wire and the second wire are further wound around the second tube.

16. An artificial muscle comprising:

a hollow pressurized expansion tube having a length and an outer radius and configured to change shape with pressurized expansion to transition between a relaxed low-pressure state and a contracted high-pressure state of the muscle, the expansion tube comprising a generally cylindrical convex outer bearing surface extending along the length and around a first portion of the radius, the bearing surface interrupted by a removed shape along at least a majority of the length and around a second portion of the radius, the removed shape defining a first contact edge, a second contact edge, and a concave opening surface therebetween; and a tension wire comprising a first end extending in a first direction, a second end extending in a second direction opposed to the first direction, and a middle portion therebetween, the middle portion in contact with the bearing surface, the first contact edge, and the second contact edge, but not in contact with the opening surface in the relaxed low-pressure state, the middle portion in contact with the opening surface in the contracted high-pressure state, the tension wire being a first tension wire wound in a clockwise direction around the expansion tube; the muscle further comprising a second tension wire wound in a counterclockwise direction around the expansion tube, the first tension wire adjacent the second tension wire, creating a wound set of tension wires;

the first end of the first tension wire, the second end of the first tension wire, the first end of the second tension wire, and the second end of the second tension wire each being wound on the same side of the expansion tube as the opening surface.

17. The muscle according to claim 16, wherein:

the opening surface is fully contained within and spaced apart from the outer radius between the first contact edge and the second contact edge;

the expansion tube is configured to produce a specified motion between the first contact edge and the second contact edge with pressurized expansion;

the expansion tube is a first expansion tube, the muscle further comprising a second expansion tube, and the muscle is configured to create a specified output characteristic of the muscle with pressurized expansion in the first expansion tube or the second expansion tube, or both; and wherein the specified output characteristic of the muscle produces a convex curve of output force versus contraction ratio.

* * * * *